US011996221B2

United States Patent
(12) United States Patent
Meguro

(10) Patent No.: US 11,996,221 B2
(45) Date of Patent: May 28, 2024

(54) COIL COMPONENT, CIRCUIT BOARD, AND ELECTRONIC DEVICE

(71) Applicant: TAIYO YUDEN CO., LTD., Tokyo (JP)

(72) Inventor: Masaatsu Meguro, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 64 days.

(21) Appl. No.: 17/160,145

(22) Filed: Jan. 27, 2021

(65) Prior Publication Data

US 2021/0241951 A1 Aug. 5, 2021

(30) Foreign Application Priority Data

Jan. 31, 2020 (JP) ................................ 2020-014364

(51) Int. Cl.
*H01F 1/24* (2006.01)
*H01F 1/153* (2006.01)
(Continued)

(52) U.S. Cl.
CPC ............... *H01F 1/24* (2013.01); *H01F 1/153* (2013.01); *H01F 17/04* (2013.01); *H01F 27/255* (2013.01); *H01F 41/06* (2013.01)

(58) Field of Classification Search
CPC . H01F 1/24; H01F 1/153; H01F 17/04; H01F 27/255; H01F 41/06;
(Continued)

(56) References Cited

U.S. PATENT DOCUMENTS

2019/0392978 A1 12/2019 Matsuura
2020/0051720 A1* 2/2020 Li ............................ H01F 1/24
2021/0175001 A1* 6/2021 Lee .......................... H01F 1/26

FOREIGN PATENT DOCUMENTS

JP 2007-012745 A 1/2007
JP 2010-034102 A 2/2010
(Continued)

OTHER PUBLICATIONS

KR20170089188A: Espacenet English machine translation (Year: 2017).*

(Continued)

*Primary Examiner* — Adil A. Siddiqui
(74) *Attorney, Agent, or Firm* — Pillsbury Winthrop Shaw Pittman, LLP

(57) ABSTRACT

A coil component relating to one embodiment of the present invention includes a base body, a coil conductor provided in the base body, and first and second external electrodes electrically connected to the coil conductor. The base body contains a first group of metal magnetic particles having a first average particle size and a second group of metal magnetic particles having a second average particle size smaller than the first average particle size. The first group of metal magnetic particles includes first metal magnetic particles, and the second group of metal magnetic particles includes second metal magnetic particles, and each second metal magnetic particle has an insulating film formed on a surface thereof. Each first metal magnetic particle has a depression shaped to conform to a part of the surface of an adjacent one of the second metal magnetic particles.

16 Claims, 10 Drawing Sheets

(51) Int. Cl.
*H01F 17/04* (2006.01)
*H01F 27/255* (2006.01)
*H01F 41/06* (2016.01)

(58) Field of Classification Search
CPC ............... H01F 1/15383; H01F 27/292; H01F 2017/048; H01F 17/0013; H01F 41/046; H01F 41/0246
See application file for complete search history.

(56) References Cited

FOREIGN PATENT DOCUMENTS

| | | | | | |
|---|---|---|---|---|---|
| JP | 2014-082382 A | | 5/2014 | | |
| JP | 2019-096816 A | | 6/2019 | | |
| JP | 2019-220609 A | | 12/2019 | | |
| KR | 20170089188 A | * | 8/2017 | ............... | H01F 1/20 |

OTHER PUBLICATIONS

Notice of Reasons for Refusal dated Sep. 5, 2023, issued in corresponding Japanese Patent Application No. 2020-014364 with English translation (13 pgs.).

* cited by examiner

COIL COMPONENT, CIRCUIT BOARD, AND ELECTRONIC DEVICE

CROSS-REFERENCE TO RELATED APPLICATIONS

This application is based on and claims the benefit of priority from Japanese Patent Application Serial No. 2020-14364 (filed on Jan. 31, 2020), the contents of which are hereby incorporated by reference in their entirety.

TECHNICAL FIELD

The present disclosure relates to a coil component, a circuit board, and an electronic device.

BACKGROUND

Electronic devices include base bodies, which are conventionally made of a variety of magnetic materials. For example, ferrite is often used as the magnetic material for coil components such as inductors. Ferrite is suitable as the magnetic material for inductors because of its high magnetic permeability.

Other than ferrite, soft magnetic metal materials are known as the magnetic materials used to make electronic devices. Since the soft magnetic metal materials have higher saturation magnetic flux densities than the ferrite material, they are suitable to make the base bodies of coil components through which large current flows. The soft magnetic metal materials are contained in the base bodies in the form of metal magnetic particles. The metal magnetic particles are made by granulating soft magnetic metal materials and have a particle size of several nanometers to several micrometers. An insulating film is provided on the surface of each metal magnetic particle contained in the base body so as to prevent a short circuit between adjacent metal magnetic particles. Such base bodies containing metal magnetic particles are made by, for example, obtaining a resin composition mixture by mixing and kneading metal magnetic particles and a resin, pouring the resin composition mixture into a mold, and applying pressure to the resin composition mixture in the mold. In other words, compression molding is employed. For example, Japanese Patent Application Publication No. 2014-082382 discloses a base body for an inductor, which can be made using compression molding.

Base bodies containing metal magnetic particles are also required to have high magnetic permeability. The magnetic permeability of the base bodies can be enhanced by raising the filling factor of the metal magnetic particles in the base bodies. Japanese Patent Application Publication No. 2010-34102 discloses an inductor including a base body containing two or more kinds of amorphous metal magnetic particles having different average particle sizes.

SUMMARY

One object of the present invention disclosed herein is to provide novel improvement so that a base body of a coil component can achieve improved filling factor for metal magnetic particles.

The other objects of the disclosure will be apparent with reference to the entire description in this specification. The present invention disclosed herein may solve any other problems grasped from the following description herein instead of or in addition to the above drawback.

A coil component relating to one embodiment of the present invention includes a base body containing a first group of metal magnetic particles having a first average particle size and a second group of metal magnetic particles having a second average particle size smaller than the first average particle size, a coil conductor provided in the base body, a first external electrode electrically connected to the coil conductor, and a second external electrode electrically connected to the coil conductor. In one embodiment of the present invention, the first group of metal magnetic particles includes first metal magnetic particles. In one embodiment of the present invention, the second group of metal magnetic particles includes second metal magnetic particles and each second metal magnetic particle has an insulating film formed on a surface thereof. In one embodiment of the present invention, each first metal magnetic particle has a depression shaped to conform to a part of the surface of an adjacent one of the second metal magnetic particles.

In one embodiment of the present invention, the first metal magnetic particles have first deformation strength, and the second metal magnetic particles have second deformation strength higher than the first deformation strength.

In one embodiment of the present invention, a ratio of the second deformation strength to the first deformation strength is 5.0 or greater.

In one embodiment of the present invention, a ratio of the second deformation strength to the first deformation strength is 2.0 or greater.

In one embodiment of the present invention, the insulating film of each second metal magnetic particle is in contact with at least a part of the depression of an adjacent one of the first metal magnetic particles.

In one embodiment of the present invention, in a cross-section of the base body, a distance between a geometric center of gravity of each first metal magnetic particle and a geometric center of gravity of an adjacent one of the second metal magnetic particles is less than a sum of the first average particle size and the second average particle size.

In one embodiment of the present invention, when a total volume of the first group of metal magnetic particles and the second group of metal magnetic particles accounts for 100 vol %, a content of the first group of metal magnetic particles ranges from 75 vol % to 95 vol %.

In one embodiment of the present invention, the first metal magnetic particles and the second metal magnetic particles both contain Fe, and an Fe content is higher in the first metal magnetic particles than in the second metal magnetic particles.

In one embodiment of the present invention, an Si content is higher in the second metal magnetic particles than in the first metal magnetic particles.

In one embodiment of the present invention, the first metal magnetic particles are crystalline alloy particles and the second metal magnetic particles are amorphous alloy particles.

In one embodiment of the present invention, the base body contains a third group of metal magnetic particles having a third average particle size smaller than the second average particle size, and the third group of metal magnetic particles includes third metal magnetic particles. In one embodiment of the present invention, each first metal magnetic particle has a depression shaped to conform to a part of a surface of an adjacent one of the third metal magnetic particles.

A circuit board relating to one embodiment of the present invention includes any one of the above-described coil components, and a mounting substrate soldered to the first and second external electrodes.

An electronic device relating to one embodiment of the present invention includes the above-described circuit board.

A method of manufacturing a coil component relating to one embodiment of the present invention includes steps of compression-molding a magnetic material into a molded body enclosing therein a coil conductor, where the magnetic material contains a first group of metal magnetic particles having a first average particle size and a second group of metal magnetic particles having a second average particle size smaller than the first average particle size, and heating the molded body obtained by the step of compression molding.

A method of manufacturing a coil component relating to one embodiment of the present invention includes steps of compression-molding a magnetic material into a plurality of compression-molded bodies, where the magnetic material contains a first group of metal magnetic particles having a first average particle size and a second group of metal magnetic particles having a second average particle size smaller than the first average particle size, providing a conductor pattern on each of the compression-molded bodies, stacking the compression-molded bodies to form a laminated body, and heating the laminated body.

A method of manufacturing a coil component relating to one embodiment of the present invention includes steps of compression-molding a magnetic material into a molded body, where the magnetic material contains a first group of metal magnetic particles having a first average particle size and a second group of metal magnetic particles having a second average particle size smaller than the first average particle size, heating the molded body obtained by the step of compression-molding to make a base body, and providing a coil conductor in the base body.

In one embodiment of the present invention, the first group of metal magnetic particles includes first metal magnetic particles having first deformation strength. In one embodiment of the present invention, the second group of metal magnetic particles includes second metal magnetic particles having second deformation strength higher than the first deformation strength, and each second metal magnetic particle has an insulating film formed on a surface thereof. In one embodiment of the present invention, in the step of compression-molding, the magnetic material is compression-molded such that a depression is formed in each first metal magnetic particle and shaped to conform to a part of the surface of an adjacent one of the second metal magnetic particles and the adjacent second metal magnetic particle is arranged in the depression.

ADVANTAGEOUS EFFECTS

According to at least one of the embodiments of the present invention, the base body of the coil component can achieve enhanced filling factor for the metal magnetic particles.

DESCRIPTION OF THE PREFERRED EMBODIMENTS

The following describes various embodiments of the present invention by referring to the appended drawings as appropriate. The constituents common to more than one drawing are denoted by the same reference signs throughout the drawings. It should be noted that the drawings do not necessarily appear to an accurate scale for the sake of convenience of explanation.

Figure 1:
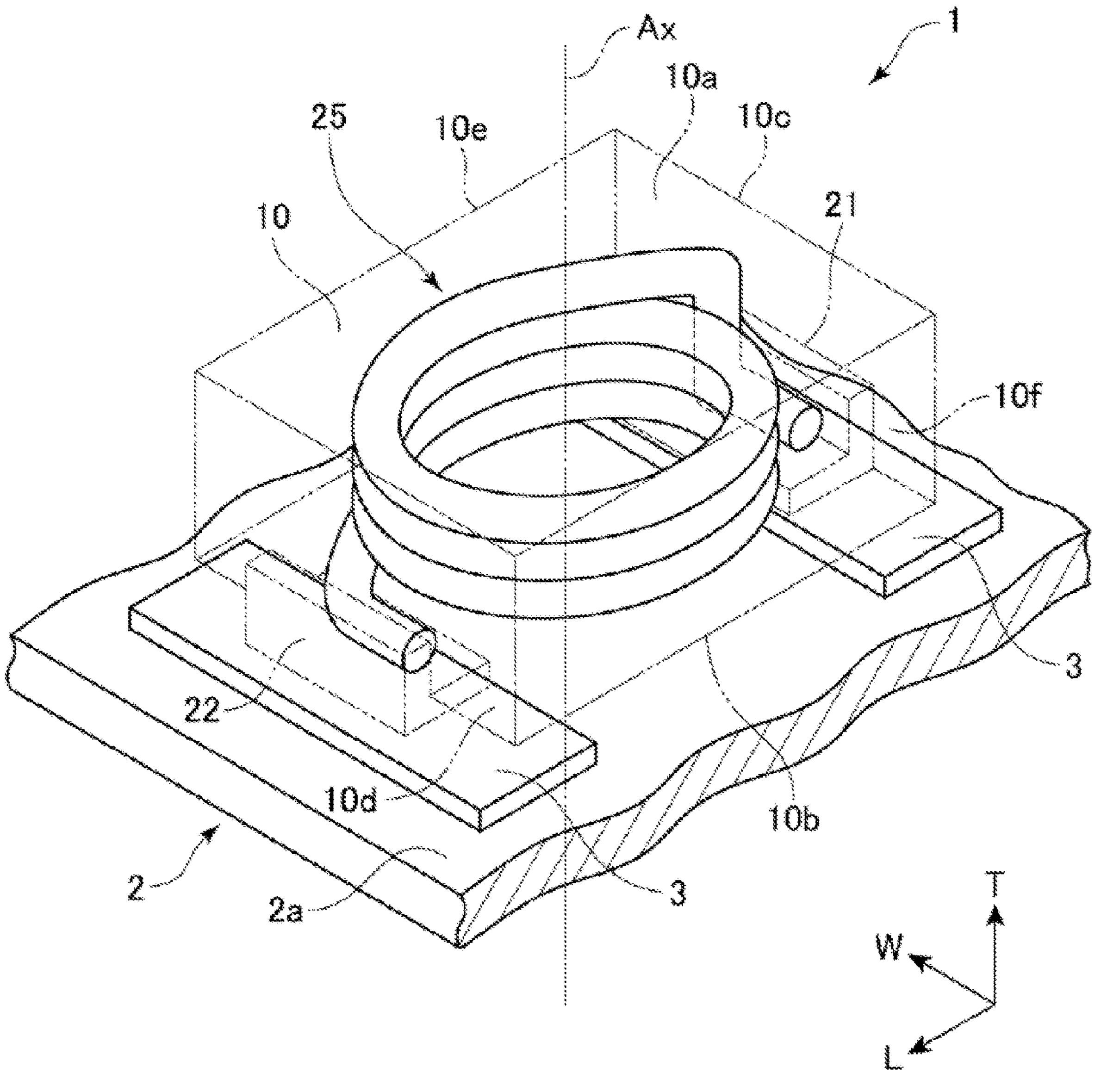
FIG. 1 is a perspective view schematically showing a coil component according to one embodiment of the present invention.
Figure 2:
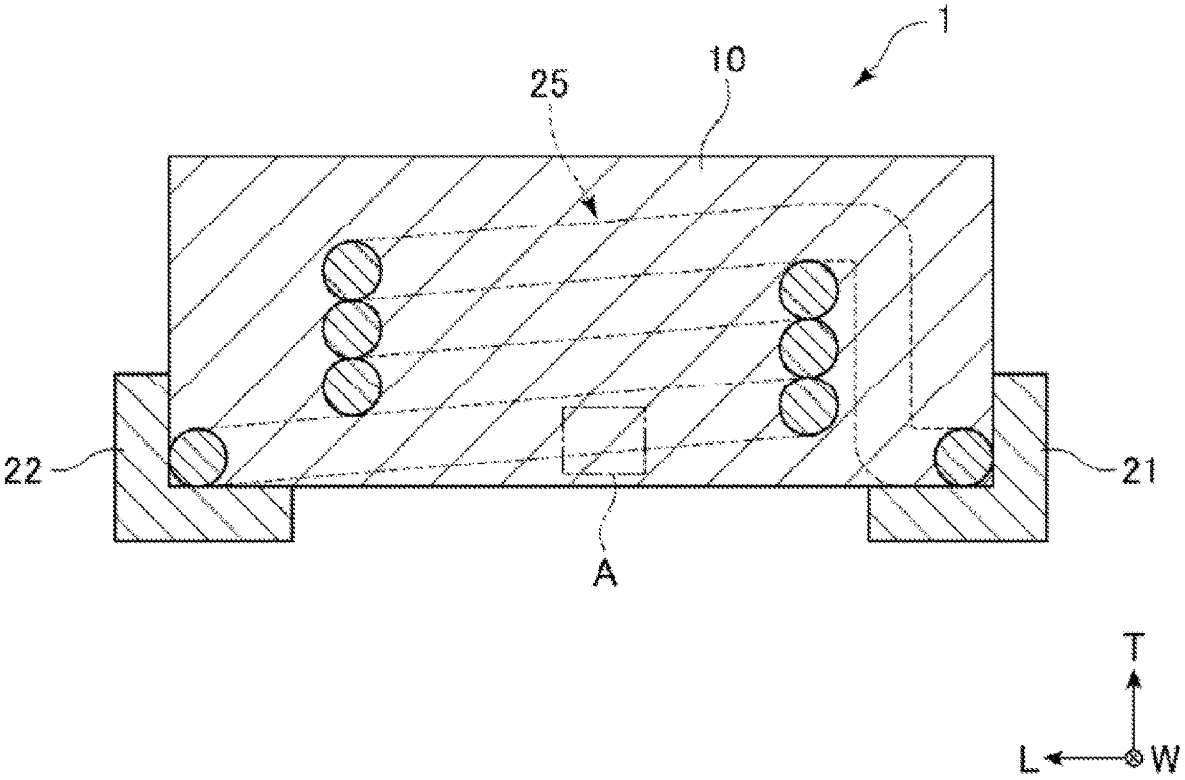
FIG. 2 is a schematic cross-sectional view of the coil component shown in FIG. 1.

A coil component 1 according to one embodiment of the present invention will be hereinafter described with reference to FIGS. 1 and 2. FIG. 1 is a schematic perspective view of the coil component 1, and FIG. 2 is a schematic cross-sectional view of the coil component 1. As shown, the coil component 1 includes a base body 10, a coil conductor 25 provided in the base body 10, an external electrode 21 disposed on a surface of the base body 10, and an external electrode 22 disposed on a surface of the base body 10 at a position spaced from the external electrode 21. The base body 10 contains a magnetic material. Therefore, the base body 10 may be referred to as the magnetic base body 10 herein.

In this specification, a "length" direction, a "width" direction, and a "thickness" direction of the coil component 1 are referred to as an "L axis" direction, a "W axis" direction, and a "T axis" direction in FIG. 1, respectively, unless otherwise construed from the context. The "thickness" direction is also referred to as the "height" direction.

The coil component 1 is mounted on a mounting substrate 2*a*. The mounting substrate 2*a* has two land portions 3 provided thereon. The coil component 1 is mounted on the mounting substrate 2*a* by bonding the external electrodes 21, 22 to the corresponding land portions 3 of the mounting substrate 2*a*. A circuit board 2 relating to one embodiment of the present invention includes the coil component 1 and the mounting substrate 2*a* having the coil component 1 mounted thereon. The circuit board 2 can be installed in various electronic devices. The electronic devices in which the circuit board 2 may be installed include smartphones, tablets, game consoles, electrical components of automobiles, servers and various other electronic devices.

The coil component 1 may be an inductor, a transformer, a filter, a reactor and any one of various other coil components. The coil component 1 may alternatively be a coupled inductor, a choke coil, and any one of various other magnetically coupled coil components. The coil component 1 may be, for example, an inductor used in a DC/DC converter. Applications of the coil component 1 are not limited to those explicitly described herein.

The magnetic base body 10 is made of a magnetic material and formed in a rectangular parallelepiped shape as a whole. In one embodiment of the invention, the magnetic base body 10 has a length (the dimension in the L axis direction) of 1.6 to 4.5 mm, a width (the dimension in the W axis direction) of 0.8 to 3.2 mm, and a height (the dimension in the T axis direction) of 0.8 to 5.0 mm. The dimensions of the magnetic base body 10 are not limited to those specified herein. The term "rectangular parallelepiped" or "rectangular parallelepiped shape" used herein is not intended to mean solely "rectangular parallelepiped" in a mathematically strict sense.

The magnetic base body 10 has a first principal surface 10*a*, a second principal surface 10*b*, a first end surface 10*c*, a second end surface 10*d*, a first side surface 10*e*, and a second side surface 10*f*. The outer surface of the magnetic base body 10 is defined by these six surfaces. The first principal surface 10*a* and the second principal surface 10*b* are at the opposite ends in the height direction of the magnetic base body 10, the first end surface 10*c* and the second end surface 10*d* are at the opposite ends in the length direction of the magnetic base body 10, and the first side surface 10*e* and the second side surface 10*f* are at the opposite ends in the width direction of the magnetic base body 10.

As shown in FIG. 1, the first principal surface 10*a* lies on the top side of the magnetic base body 10, and therefore, the first principal surface 10*a* may be herein referred to as "the top surface." Similarly, the second principal surface 10*b* may be referred to as "the bottom surface." The coil component 1 is disposed such that the second principal surface 10*b* faces the mounting substrate 2*a*, and therefore, the second principal surface 10*b* may be herein referred to as "the mounting surface." The top-bottom direction of the coil component 1 refers to the top-bottom direction in FIG. 1.

In one embodiment of the present invention, the external electrode 21 extends on the mounting surface 10*b* and the end surface 10*c* of the magnetic base body 10. The external electrode 22 extends on the mounting surface 10*b* and the end surface 10*d* of the magnetic base body 10. The shape and positioning of the external electrodes 21, 22 are not limited to those in the example shown. The external electrodes 21 and 22 are separated from each other in the length direction.

The coil conductor 25 is wound spirally around a coil axis Ax extending in the thickness direction (the T-axis direction). The coil conductor 25 is connected at one end thereof to the external electrode 21 and connected at the other end thereof to the external electrode 22. In the illustrated embodiment, only the ends of the coil conductor 25 are exposed on the magnetic base body 10 and the remaining portion is positioned within the magnetic base body 10. The coil conductor 25 may be provided within the magnetic base body 10 in this manner. In the illustrated embodiment, the coil axis Ax intersects the first and second principal surfaces 10*a* and 10*b*, but does not intersect the first and second end surfaces 10*c* and 10*d* and the first and second side surfaces 10*e* and 10*f*. In other words, the first and second end surfaces 10*c* and 10*d* and the first and second side surfaces 10*e* and 10*f* extend along the coil axis Ax.

Figure 3:
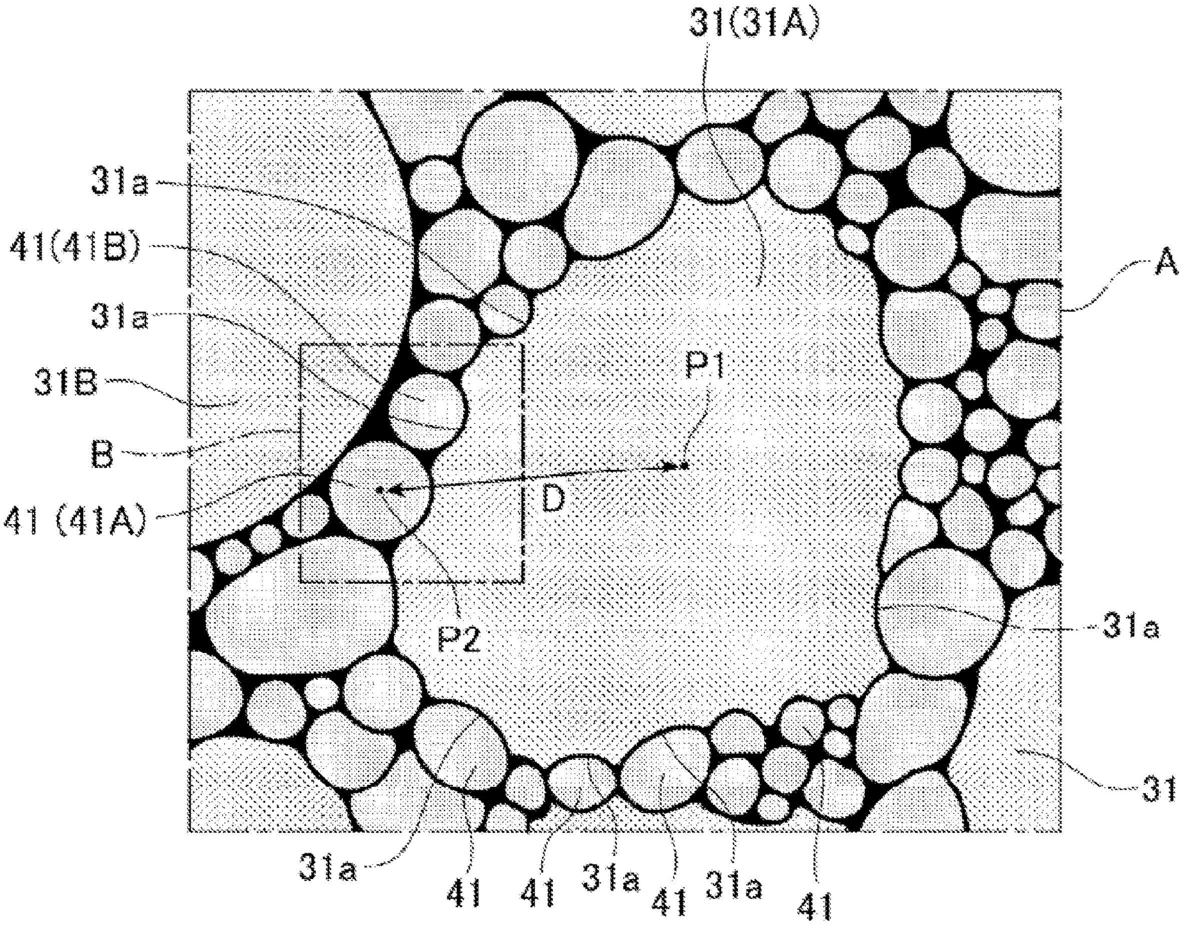
FIG. 3 is an enlarged schematic view of a region A of the base body shown in FIG. 2.

In one embodiment of the present invention, the magnetic base body 10 is made of a magnetic material containing a plurality of metal magnetic particles. As shown in FIG. 3, the magnetic base body 10 relating to one embodiment contains a plurality of first metal magnetic particles 31 and a plurality of second metal magnetic particles 41. In this specification, the first metal magnetic particles 31 may be collectively referred to as a first group of metal magnetic particles, and the second metal magnetic particles 41 may be collectively referred to as a second group of metal magnetic particles. In other words, the first group of metal magnetic particles includes the first metal magnetic particles 31, and the second group of metal magnetic particles includes the second metal magnetic particles 41. In one embodiment, the average particle size of the second metal magnetic particles 41 contained in the magnetic base body 10 (in other words, the average particle size of the second group of metal magnetic particles) is ½ or less, ⅓ or less, or ¼ or less of the average particle size of the first metal magnetic particles 31 contained in the magnetic base body 10 (in other words, the average particle size of the first group of metal magnetic particles). In one embodiment, the average particle size of the second metal magnetic particles 41 contained in the magnetic base body 10 is 1/20 or greater, 1/10 or greater, or ⅕ or greater of the average particle size of the first metal magnetic particles 31 contained in the magnetic base body 10. The ratio of the average particle size of the second metal magnetic particles 41 to the average particle size of the first metal magnetic particles 31 is not limited to any of the above-listed numerical values. The average particle size of the first metal magnetic particles 31 is, for example, 4 μm to 30 μm. The average particle size of the second metal magnetic particles 41 is, for example, 0.2 μm to 6 μm. When the second metal magnetic particles 41 have a smaller average particle size than the first metal magnetic particles 31, the second metal magnetic particles 41 can easily intervene between the adjacent two of the first metal magnetic particles 31. Consequently, the magnetic base body 10 can achieve a higher filling factor (or density) of the metal magnetic particles.

For the convenience of description, one of the first metal magnetic particles 31 contained in the magnetic base body 10 that is centrally positioned in the field of view shown in FIG. 3 may be referred to as a first metal magnetic particle 31A, and two of the second metal magnetic particles 41 contained in the magnetic base body 10 that are in contact with the first metal magnetic particle 31A on the left side may be referred to as second metal magnetic particles 41A and 41B. The first metal magnetic particle 31A is distinguished from the other first metal magnetic particles 31 and the second metal magnetic particles 41A and 41B are distinguished from the other second metal magnetic particles 41 only for the sake of description. Thus, the description made for the first metal magnetic particles 31 also applies to the first metal magnetic particle 31A, and the description made for the second metal magnetic particles 41 also applies to the second metal magnetic particles 41A and 41B.

In one embodiment of the present invention, the magnetic base body 10 may contain three types of metal magnetic particles having different average particle sizes from each other. In this case, the magnetic base body 10 contains a third group of metal magnetic particles in addition to the first and second groups of metal magnetic particles. The third group of metal magnetic particles includes a plurality of third metal magnetic particles. The average particle size of the third metal magnetic particles (namely, the average particle size of the third group of metal magnetic particles) is, for example, 0.1 μm to 1 μm.

In this specification, the average particle size of the first group of metal magnetic particles may be referred to as a first average particle size, the average particle size of the second group of metal magnetic particles may be referred to as a second average particle size, and the average particle size of the third group of metal magnetic particles may be referred to as a third average particle size.

As used herein, the term "average particle size" of the metal magnetic particles is determined based on a particle size distribution. To determine the particle size distribution, the magnetic base body is cut along the thickness direction (T-axis direction) to expose a cross-section, and the cross-section is scanned by a scanning electron microscope (SEM) to take a photograph at a 1000 to 2000-fold magnification, and the particle size distribution is determined based on the photograph. For example, the value at 50 percent (D50) of the particle size distribution determined based on the SEM photograph can be set as the average particle size of the metal magnetic particles.

As shown in FIG. 3, in the cross-section of the magnetic base body 10, the first metal magnetic particle 31A is surrounded by a plurality of second metal magnetic particles 41. In other words, in the cross-section of the magnetic base body 10, a plurality of second metal magnetic particles 41 are arranged around the single first metal magnetic particle 31. In one embodiment, one or more second metal magnetic particles 41 intervene between adjacent ones of the first metal magnetic particles 31. In one embodiment, the first metal magnetic particles 31 are not directly in contact with each other. In the magnetic base body 10, some of the first metal magnetic particles 31 may be in contact with the other first metal magnetic particles 31*d*. It is, however, desirable to prevent the first metal magnetic particles 31 from contacting with each other. This can completely or partly prevent large eddy current loss, which may be caused by a short circuit caused between the first metal magnetic particles 31.

In one embodiment of the present invention, the distance between the geometric center of gravity of a given one of the first metal magnetic particles 31 and the geometric center of gravity of one of the second metal magnetic particles 41 surrounding the given first metal magnetic particle 31 is less than the sum of the first average particle size and the second average particle size. FIG. 3 shows the geometric center of gravity P1 of the first metal magnetic particle 31A and the geometric center of gravity P2 of the second metal magnetic particle 41A. In the embodiment shown in FIG. 3, D denotes the distance between the center of gravity P1 and the center of gravity P2 and the distance D is less than the sum of the first average particle size and the second average particle size. The distance D is less than the sum of the first average particle size and the second average particle size because, as will be described below, the second metal magnetic particles 41 are pushed into the first metal magnetic particles 31 during the compression molding. As a result, the first metal magnetic particles 31 are inwardly dented by the pressing force applied by the second metal magnetic particles 41. Accordingly, if the first metal magnetic particles 31 have a particle size substantially equal to the first average particle size, the distance D is less than the sum of the first average particle size and the second average particle size. Every one of the second metal magnetic particles 41 surrounding a given one of the first metal magnetic particles 31 may satisfy the above-described relation that the distance between their respective geometric centers of gravity is less than the sum of the first and second average particle sizes. Alternatively, only some of the second metal magnetic particles 41 surrounding a given one of the first metal magnetic particles 31 satisfy the above-described relation that the distance between their respective geometric centers of gravity is less than the sum of the first and second average particle sizes.

The first, second and third metal magnetic particles are made of various soft magnetic materials. In one embodiment of the present invention, the first, second and third metal magnetic particles are made of a soft magnetic material mainly containing Fe. Specifically, the first, second and third metal magnetic particles are particles of (1) a metal such as Fe or Ni, (2) a crystalline alloy such as an Fe—Si—Cr alloy, an Fe—Si—Al alloy, an Fe—Si alloy or an Fe—Ni alloy, (3) an amorphous alloy such as an Fe—Si—Cr—B—C alloy or an Fe—Si—Cr—B alloy, or (4) a mixture thereof. The composition of the metal magnetic particles contained in the magnetic base body 10 is not limited to those described above.

Figure 4A:
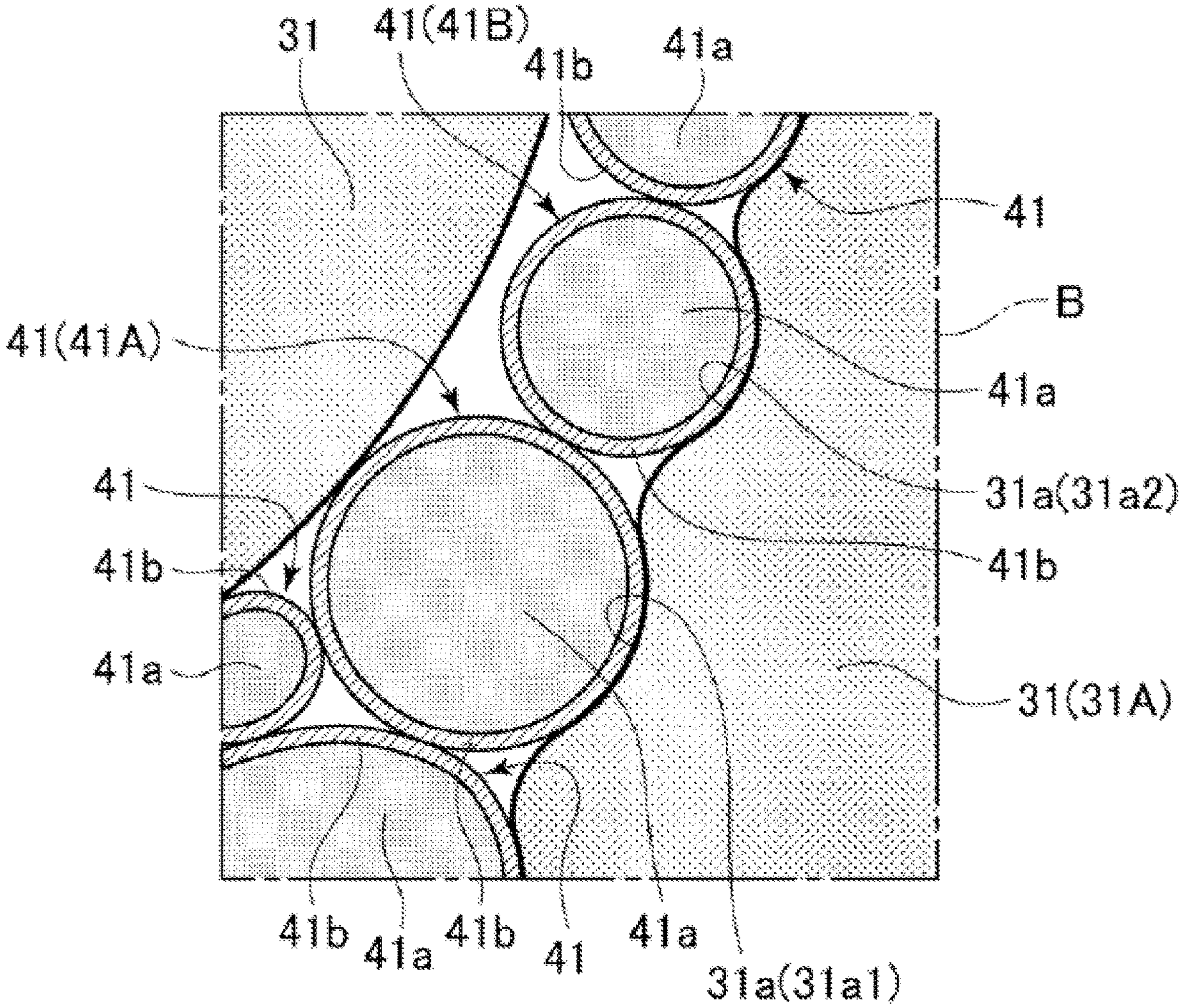
FIG. 4A is an enlarged schematic view of a region B shown in FIG. 3.

The first, second and third metal magnetic particles may have, on their respective surfaces, an insulting film formed of, for example, a glass, a resin, or other highly insulating materials. As shown in FIG. 4A, which is a schematic enlarged cross-sectional view of a region B in FIG. 3, the second metal magnetic particles 41 each have a core 41*a* made of a soft magnetic metal material and an insulating film 41*b* on the surface of the core in one embodiment of the present invention. In one embodiment, the core 41*a* is made of any one of the above-listed soft magnetic metal materials. In one embodiment, the insulating film 41*b* is an oxide film made of an oxide of the soft magnetic metal material, which is obtained by oxidizing the surface of the core 41*a*. In one embodiment, the insulating film 41*b* is a coating film made of silica, Ni—Zn ferrite, glass or any other insulating materials. The coating film may be formed on the surface of the core 41*a* through a coating process using, for example, the sol-gel method. In one embodiment of the present invention, the insulating film 41*b* is less ductile than the core 41*a*. For example, when the insulating film 41*b* is made of silica or an oxide of the core 41*a*, the insulating film 41*b* is less ductile than the core 41*a*, which is made of a soft magnetic metal material.

In the magnetic base body 10 relating to one embodiment of the present invention, the first metal magnetic particles 31 have a higher content ratio by volume than the second metal magnetic particles 41. For example, when the total volume of the first metal magnetic particles 31 and the second metal magnetic particles contained in the magnetic base body 10 accounts for 100 vol %, the total content ratio of the first metal magnetic particles 31 ranges from 75 vol % to 95 vol %. In one embodiment, the total content ratio of the first metal magnetic particles 31 ranges from 80 vol % to 90 vol %. When the content ratios by volume of the first and second metal magnetic particles 31 and 41 contained in the magnetic base body 10 are mentioned below, they mean the contents of the first and second metal magnetic particles 31 and 41 determined when the total volume of the first metal magnetic particles 31 and the second metal magnetic particles contained in the magnetic base body 10 accounts for 100 vol %. As mentioned above, the first metal magnetic particles 31 have a higher content ratio by volume than the second metal magnetic particles 41 in the magnetic base body 10. According to the findings of the present inventors, if the total content ratio of the first metal magnetic particles 31 exceeds 90 vol % in the magnetic base body 10, the second metal magnetic particles 41 hardly intervene between the first metal magnetic particles 31 in the magnetic base body 10 but are mainly seen at a triple-point formed by three first metal magnetic particles 31 (or the gap defined between three first metal magnetic particles 31). If the total content ratio of the first metal magnetic particles 31 in the magnetic base body 10 exceeds 90 vol % and the above situation arises, the pressure applied during the compression molding step in the fabrication of the magnetic base body 10 is mainly transferred between the first metal particles 31 and rarely transferred to the second metal magnetic particles 41. If the total content ratio of the first metal magnetic particles 31 in the magnetic base body 10 exceeds 95 vol %, the pressure applied during the compression molding step in the fabrication of the magnetic base body 10 is mainly transferred between the first metal magnetic particles 31 and more rarely transferred to the second metal magnetic particles 41. Accordingly, depressions 31*a*, described below, are unlikely to be formed on the surface of the first metal magnetic particles 31 if the total content ratio of the first metal magnetic particles 31 in the magnetic base body 10 exceeds 90 vol %. As a result, the magnetic base body 10 faces difficulties in accomplishing sufficiently enhanced filling factor. If the total content ratio of the first metal magnetic particles 31 in the magnetic base body 10 exceeds 95 vol %, the depressions 31*a*, described below, are more unlikely to be formed on the surface of the first metal magnetic particles 31. As a result, the magnetic base body 10 faces greater difficulties in accomplishing sufficiently enhanced filling factor. On the other hand, if the total content ratio of the first metal magnetic particles 31 in the magnetic base body 10 falls below 80%, the content ratio of the second metal magnetic particles 41, which have a relatively smaller average particle size, increases. Accordingly, it becomes difficult to enhance the filling factor of the magnetic base body 10. Furthermore, if the total content ratio of the first metal magnetic particles 31 in the magnetic base body 10 falls below 75%, the content ratio of the second metal magnetic particles 41, which have a relatively smaller average particle size, increases and, in addition, more than one second metal magnetic particle 41 intervene between adjacent ones of the first metal magnetic particles 31. Accordingly, the filling factor of the magnetic base body 10 may significantly drop. For the reasons stated above, in one embodiment of the present invention, the total content ratio of the first metal magnetic particles 31 in the magnetic base body 10 ranges from 75 vol % to 95 vol %.

In one embodiment of the present invention, the Fe content ratio is higher in the first metal magnetic particles 31 than in the second metal magnetic particles 41. In one embodiment of the present invention, the Si content ratio is higher in the second metal magnetic particles 41 than in the first metal magnetic particles 31. For example, when both the first and second metal magnetic particles 31 and 41 are Fe—Si—Cr alloy particles, the composition of the first metal magnetic particles 31 may be described as Fe: 95 wt %, Si: 3.5%, Cr; 1.5 wt %, and the composition of the second metal magnetic particles 41 may be described as Fe: 92 wt %, Si: 6.5%, Cr; 1.5 wt %. The first metal magnetic particles 31 may be free of Si. In a case where the first metal magnetic particles 31 are free of Si, it is still considered true that the Si content ratio is higher in the second metal magnetic particles 41 than in the first metal magnetic particles 31. In one embodiment of the present invention, since the Si content ratio is higher in the second metal magnetic particles 41 than in the first metal magnetic particles 31, the second metal magnetic particles 41 can achieve higher deformation strength than the first metal magnetic particles 31. In one embodiment of the present invention, the Si content ratios in the first and second metal magnetic particles 31 and 41 are determined such that the deformation strength of the second metal magnetic particles 41 is twice or more, three times or more, four times or more, or five times or more as high as the deformation strength of the first metal magnetic particles 31. In one embodiment of the present invention, the first metal magnetic particles 31 exhibits a higher content ratio by volume than the second metal magnetic particles 41. Accordingly, if the Fe content ratio is set higher in the first metal magnetic particles 31 than in the second metal magnetic particles 41, the magnetic base body 10 can achieve higher saturation magnetic flux density than in a case where the Fe content ratio in the first metal magnetic particles 31 is set equal to or lower than the Fe content ratio in the second metal magnetic particles 41.

In one embodiment of the present invention, the second metal magnetic particles 41 have higher deformation strength than the first metal magnetic particles 31. Deformation of metal magnetic particles (including the first and second metal magnetic particles 31 and 41) can be classified into plastic deformation and elastic deformation. As used herein, the term "deformation strength" may mean deformation strength that may be observed when plastic or elastic deformation may occur. In the specification, the deformation strength of the first metal magnetic particles 31 may be referred to as first deformation strength, and the deformation strength of the second metal magnetic particles 41 may be referred to as second deformation strength. Following these rules, the second deformation strength is higher than the first deformation strength in one embodiment. In one embodiment of the present invention, when the magnetic base body 10 contains the third metal magnetic particles, the third metal magnetic particles have higher deformation strength than the first metal magnetic particles 31. The deformation strength of the metal magnetic particles denotes the strength required to deform the metal magnetic particles when the metal magnetic particles are compressed. The deformation strength of the metal magnetic particles indicates how difficult it is to deform the metal magnetic particles and is measured in accordance with JIS Z 8844:2019, for example. The deformation strength of the metal magnetic particles can be measured using, for example, a micro compression tester (MCT-211) available from SHIMADZU Corporation. In one embodiment of the present invention, since the second deformation strength is higher than the first deformation strength, the second metal magnetic particles 41 are more difficult to deform during the compression molding than the first metal magnetic particles 31.

Since the first metal magnetic particles 31 are easier to deform than the surrounding second metal magnetic particles 41, one or more depressions 31*a* are formed on the surface of the first metal magnetic particles 31 at positions where the second metal magnetic particles 41 are in contact, when pressure is applied to the magnetic material containing the first and second metal magnetic particles 31 and 41. In this way, the first metal magnetic particles 31 have one or more depressions on the surface thereof. In the embodiment shown in FIG. 3, the first metal magnetic particle 31A has more than one depression on the surface thereof. For the sake of simplified illustration, the reference sign 31*a* is assigned to only some of the depressions of the first metal magnetic particle 31A. The number and shape of the depressions 31*a* of the first metal magnetic particle 31A are not limited to those shown.

In one embodiment of the present invention, the magnetic base body 10 may contain a binder binding together the first and second metal magnetic particles 31 and 41. The binder is, for example, a highly insulating thermosetting resin. The binder is made of a resin material having lower permeability than the metal magnetic particles. Examples of the resin material of the binder include an epoxy resin, a polyimide resin, a polystyrene (PS) resin, a high-density polyethylene (HDPE) resin, a polyoxymethylene (POM) resin, a polycarbonate (PC) resin, a polyvinylidene fluoride (PVDF) resin, a phenolic resin, a polytetrafluoroethylene (PTFE) resin, or a polybenzoxazole (PBO) resin. In one embodiment, when the total volume of the first metal magnetic particles 31 and the second metal magnetic particles 41 contained in the magnetic base body 10 accounts for 100 vol %, the binder accounts for 8 vol % or less, 5 vol % or less, or 3 vol % or less. The binder is pushed away by the first and second metal magnetic particles 31 and 41 during the compression molding, so that the binder is moved to the gaps between these metal magnetic particles. For this reason, if the content of the binder is controlled to be 8 vol % or less as mentioned above, the binder does not make substantial impact on the transfer of the pressure between the first metal magnetic particles 31 and the second metal magnetic particles 41 in the compression molding.

Figure 4B:
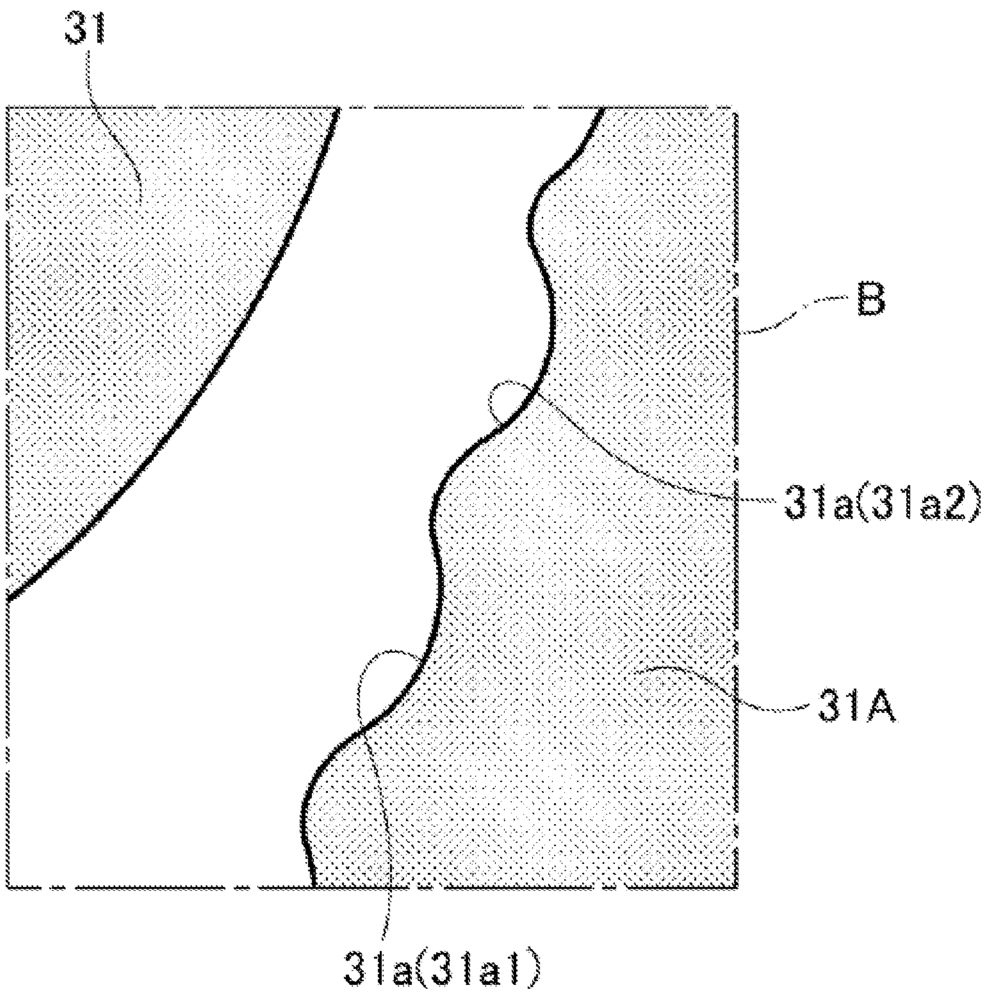
FIG. 4B schematically shows the region B, in which second metal magnetic particles are not shown.

Referring to FIGS. 4A and 4B, a further description is given of the microstructure in the vicinity of the position where the first metal magnetic particle 31A is in contact with the second metal magnetic particles 41A and 41B. FIG. 4A is a schematic enlarged cross-sectional view of the region B in the cross-section of the magnetic base body 10 shown in FIG. 3, and FIG. 4B does not show the second metal magnetic particles 41 for the sake of convenience. For the sake of convenience, one of the depressions 31*a* of the first metal magnetic particle 31A that is in contact with the second metal magnetic particle 41A is referred to as a depression 31*a*1 and one of the depressions 31*a* of the first metal magnetic particle 31A that is in contact with the second metal magnetic particle 41B is referred to as a depression 31*a*2.

As shown in FIGS. 4A and 4B, the depression 31*a*1 of the first metal magnetic particle 31A is shaped to conform to a part of the surface of the second metal magnetic particle 41A in one embodiment of the present invention. In one embodiment of the present invention, the shape of the depression 31*a*1 is complementary to the shape of a part of the surface of the second metal magnetic particle 41A. For example, at the position where the first metal magnetic particle 31A is in contact with the second metal magnetic particle 41A, the depression 31*a*1 has the same or substantially the same curvature as the surface of the second metal magnetic particle 41A. When K1 denotes the curvature of the depression 31*a*1 at the position where the first metal magnetic particle 31A is in contact with the second metal magnetic particle 41A, and K2 denotes the curvature of the surface of the second metal magnetic particle 41A at the same position, $(K2-K1)/K2$ represents the ratio of the difference between the curvatures K1 and K2 to the curvature K2. If the ratio $(K2-K1)/K2$ is less than 0.05, 0.04, 0.03, 0.02 or 0.01, the curvature K1 of the depression 31*a*1 can be deemed substantially the same as the curvature K2 of the surface of the second metal magnetic particle 41A.

In one embodiment of the present invention, the second metal magnetic particle 41A is positioned around the first metal magnetic particle 31A such that the second metal magnetic particle 41A is partially accommodated in the depression 31*a*1. In one embodiment of the present invention, the second metal magnetic particle 41A is in contact with the depression 31*a*1 at the insulating film 41*b* thereof. In one embodiment of the present invention, the part of the surface of the second metal magnetic particle 41A that is in contact with the depression 31*a*1 accounts for 10% or greater, 20% or greater, 30% or greater, 40% or greater, or 50% or greater of the total surface area of the second metal magnetic particle 41A.

In one embodiment of the present invention, the depression 31*a*1 of the first metal magnetic particle 31A is an inwardly convex curved surface of the first metal magnetic particle 31A. When seen in cross-section, this curved surface can be shaped like, for example, an arc, an elliptic arc, a long arc or any other shapes. The depression 31*a*1 of the first metal magnetic particle 31A has the above-described inwardly convex curved surface, 50% or greater, 60% or greater, 70% or greater, 80% or greater, 90% or greater, 95% or greater, 96% or greater, 97% or greater, 98% or greater, 99% or greater or 100% of which may be in contact with the insulating film 41*b* of the second metal magnetic particle 41A.

Similarly to the depression 31*a*1, the depression 31*a*2 of the first metal magnetic particle 31A is shaped to conform to a part of the surface of the second metal magnetic particle 41B. The relation between the depression 31*a*1 and the second metal magnetic particle 41A is described in the above, and the same description applies to the relation between the depression 31*a*2 and the second metal magnetic particle 41B. For example, the depression 31*a*2 is shaped to conform to a part of the surface of the second metal magnetic particle 41B.

In one embodiment of the present invention, among the depressions 31*a* of the first metal magnetic particle 31A, the depressions excluding the depressions 31*a*1 and 31*a*2 are also shaped to conform to a part of the surface of the second metal magnetic particles 41 facing these other depressions, similarly to the depressions 31*a*1 and 31*a*2. In one embodiment, when the first metal magnetic particle 31A has a plurality of depressions 31*a*, all of the depressions 31*a* may not be in contact with the second metal magnetic particles 41. In other words, only some of the depressions 31*a* are in contact with the second metal magnetic particles 41, and the remaining ones may not need to be in contact with the second metal magnetic particles 41.

The second metal magnetic particles 41 are generally shaped like a sphere. Accordingly, the second metal magnetic particles 41 generally have a circular shape in the cross-section shown in FIGS. 3 and 4A. As will be described in detail below, the process of manufacturing the magnetic base body 10 includes a step of applying pressure to the magnetic material containing the first and second metal magnetic particles 31 and 41 (for example, the compression molding step). The pressure or load applied to the magnetic material may push the second metal magnetic particles 41 into the first metal magnetic particles 31. This creates, on the surface of the first metal magnetic particles 31, one or more depressions 31*a* shaped to conform to a part of the surface of the second metal magnetic particles 41. Since the second metal magnetic particles 41 have higher deformation strength than the first metal magnetic particles 31, the second metal magnetic particles 41 do not substantially deform when pushed into the first metal magnetic particles 31. If the second metal magnetic particles 41 "do not substantially deform" when pushed into the first metal magnetic particles 31, this may mean that the second metal magnetic particles 41 do not experience compression-induced deformation of 10% or greater. Since the pressure applied during the manufacturing process does not substantially deform the second metal magnetic particles 41, the insulating film 41*b* formed on the surface of the second metal magnetic particles 41 is unlikely to be damaged.

Figure 5:
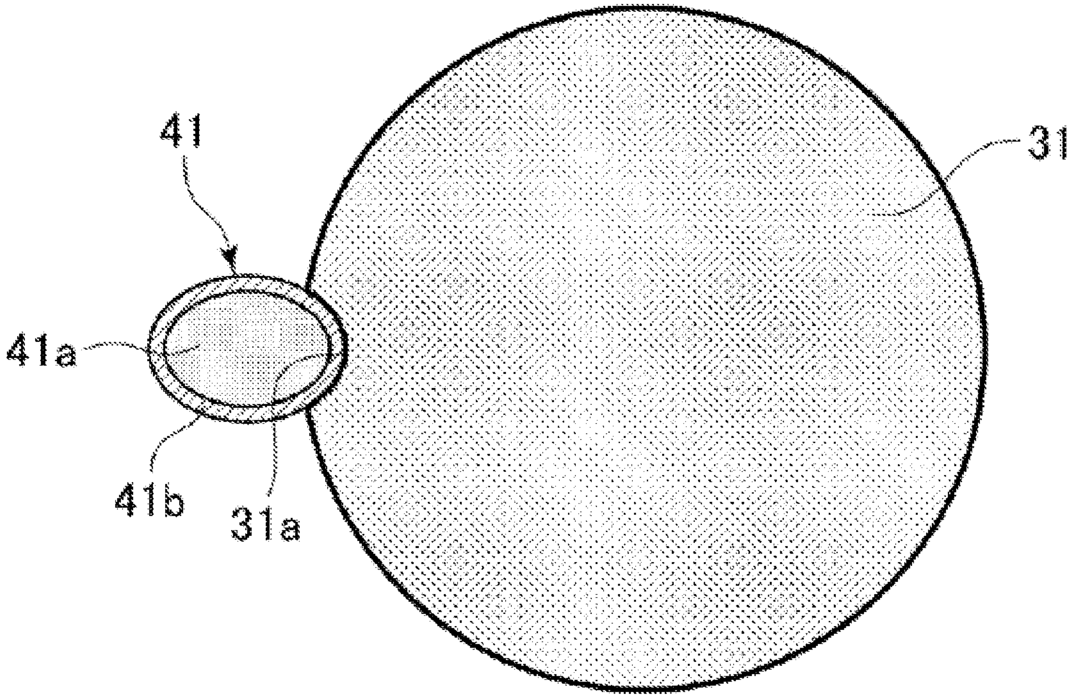
FIG. 5 schematically shows how first and second metal magnetic particles are positioned relative to each other in another embodiment of the present invention.

FIG. 5 schematically shows one of the first metal magnetic particles 31 and one of the second metal magnetic particles 41 contained in the magnetic base body 10 of the coil component 1 relating to another embodiment of the present invention. As shown, the second metal magnetic particle 41 may have an elliptical shape when seen in the cross-section. In this case, the depression 31*a* of the first metal magnetic particle 31 is shaped to conform to a part of the elliptical surface of the second metal magnetic particle 41. The shape of the second metal magnetic particle 41 when seen in the cross-section is not limited to a circle and an ellipse. The shape of the second metal magnetic particle 41 when seen in the cross-section may be an oval or any other shapes. Irrespective of the shape of the second metal magnetic particle 41, the depression 31*a* of the first metal magnetic particle 31 can be shaped to conform to a part of the surface of the second metal magnetic particles 41 positioned to face the depression 31*a*.

In one embodiment of the present invention, if the magnetic base body 10 contains the third metal magnetic particles, the depressions 31*a* of the first metal magnetic particles 31 may be shaped to conform to a part of the surface of the third metal magnetic particles positioned to face the depressions 31*a*.

An example method of manufacturing the coil component 1 according to one embodiment of the invention will now be described. The following describes an example method of manufacturing the coil component 1 using a compression molding process. The method of manufacturing the coil component 1 using the compression molding process includes a compression molding step where the metal magnetic particles and resin are mixed and kneaded to produce a resin composition mixture and the resin composition mixture is subjected to compression molding to form a molded body, and a heat treatment step where the molded body resulting from the compression molding step is heated.

In the compression molding step, a particle mixture of a first group of metal magnetic particles and a second group of metal magnetic particles is mixed and kneaded with a resin and a diluting solvent, thereby making a resin composition mixture. The first and second groups of metal magnetic particles respectively include the first metal magnetic particles 31 and the second metal magnetic particles 41. When the magnetic base body also contains the third metal magnetic particles, the particle mixture also includes the third metal magnetic particles.

Figure 6:
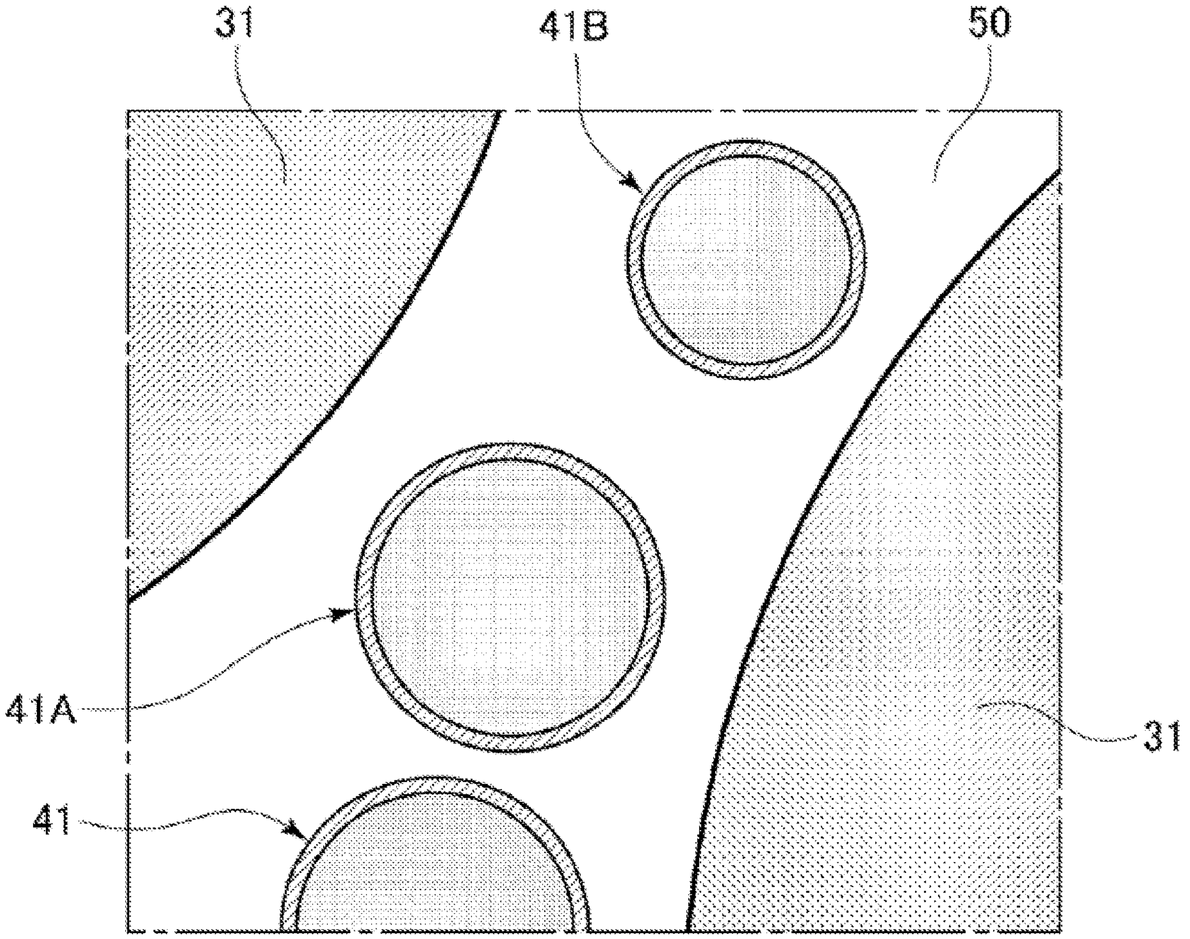
FIG. 6 schematically shows a resin composition mixture before being subjected to compression molding.

Following this, the coil conductor 25, which is prepared in advance, is placed in a mold, the resin composition mixture made in the above manner is placed into the mold having the coil conductor 25 therein, and appropriate molding pressure is then applied to the resin composition mixture in the mold. In this manner, a molded body enclosing therein the coil conductor 25 is fabricated. In one embodiment of the present invention, the appropriate molding pressure is 5 to 10 t/cm$^2$. FIG. 6 is a schematic cross-sectional view showing in cross-section the region corresponding to the region B shown in FIG. 3 of the resin composition mixture placed in the molding die before the molding pressure is applied. As shown in FIG. 6, in the resin composition mixture before the molding pressure is applied, the first and second metal magnetic particles 31 and 41 are dispersed in the resin. Once the molding pressure is applied to the resin composition mixture, the second metal magnetic particles 41 (the second metal magnetic particles 41A, 41B in the example of FIG. 4A) are inwardly pushed into the first metal magnetic particles (the first metal magnetic particle 31A in the example of FIG. 4A) as has been described with reference to FIG. 4A. The second metal magnetic particles 41A and 41B, which have relatively high deformation strength, do not substantially deform when inwardly pushed into the first metal magnetic particle 31A. Therefore, the depressions 31*a*1 and 31*a*2 are formed in the first metal magnetic particle 31A and shaped to conform to a part of the surface of the second metal magnetic particles 41A and 41B. When the second metal magnetic particles 41 have twice or more as high deformation strength as the first metal magnetic particles 31, the second metal magnetic particles 41 do not substantially deform when inwardly pushed into the first metal magnetic particles 31. As described above, as a result of the compression molding step, the second metal magnetic particles 41A and 41B move into the first metal magnetic particle 31A, so that the one or more depressions 31*a* are formed in the first metal magnetic particle 31A. The second metal magnetic particles 41A and 41B may move into any one of the other first metal magnetic particles 31 (for example, the first metal magnetic particle 31 at the upper left section in FIG. 4A) in addition to or in place of the first metal magnetic particle 31A. As a result of the molding pressure applied, the second metal magnetic particles 41 other than the second metal magnetic particles 41A and 41B may also move into their adjacent first metal magnetic particles 31.

After the molded body is obtained through the compression molding step, the manufacturing method proceeds to the heat treatment step. In the heat treatment step, heat treatment is performed on the molded body obtained in the compression molding step to obtain the magnetic base body 10 enclosing therein the coil conductor 25. This heat treatment cures the resin in the resin composition mixture, so that the resin serves as the binder, and the binder binds together the first metal magnetic particles 31 and the second metal magnetic particles 41. The heat treatment is performed at a temperature equal to or higher than the curing temperature of the resin in the resin composition mixture, for example, at a temperature from 150° C. to 300° C. for a duration of 30 to 240 minutes.

Next, a conductor paste is applied to both end portions of the magnetic base body 10, which is produced in the above-described manner, to form the external electrode 21 and the external electrode 22. The external electrode 21 is electrically connected to one end of the coil conductor 25 placed within the magnetic base body 10, and the external electrode 22 is electrically connected to the other end of the coil conductor 25 placed within the magnetic base body 10. The external electrodes 21, 22 may include a plating layer. There may be two or more plating layers. The two plating layers may include an Ni plating layer and an Sn plating layer externally provided on the Ni plating layer. The coil component 1 is manufactured in this manner.

The manufactured coil component 1 may be mounted on the mounting substrate 2*a* using a reflow process. In this process, the mounting substrate 2*a* having the coil component 1 thereon passes at a high speed through a reflow furnace heated to, for example, a peak temperature of 260° C., and then the external electrodes 21, 22 are soldered to the corresponding land portions 3 of the mounting substrate 2*a*. In this way, the coil component 1 is mounted on the mounting substrate 2*a*, and thus the circuit board 2 is manufactured.

Figure 7:
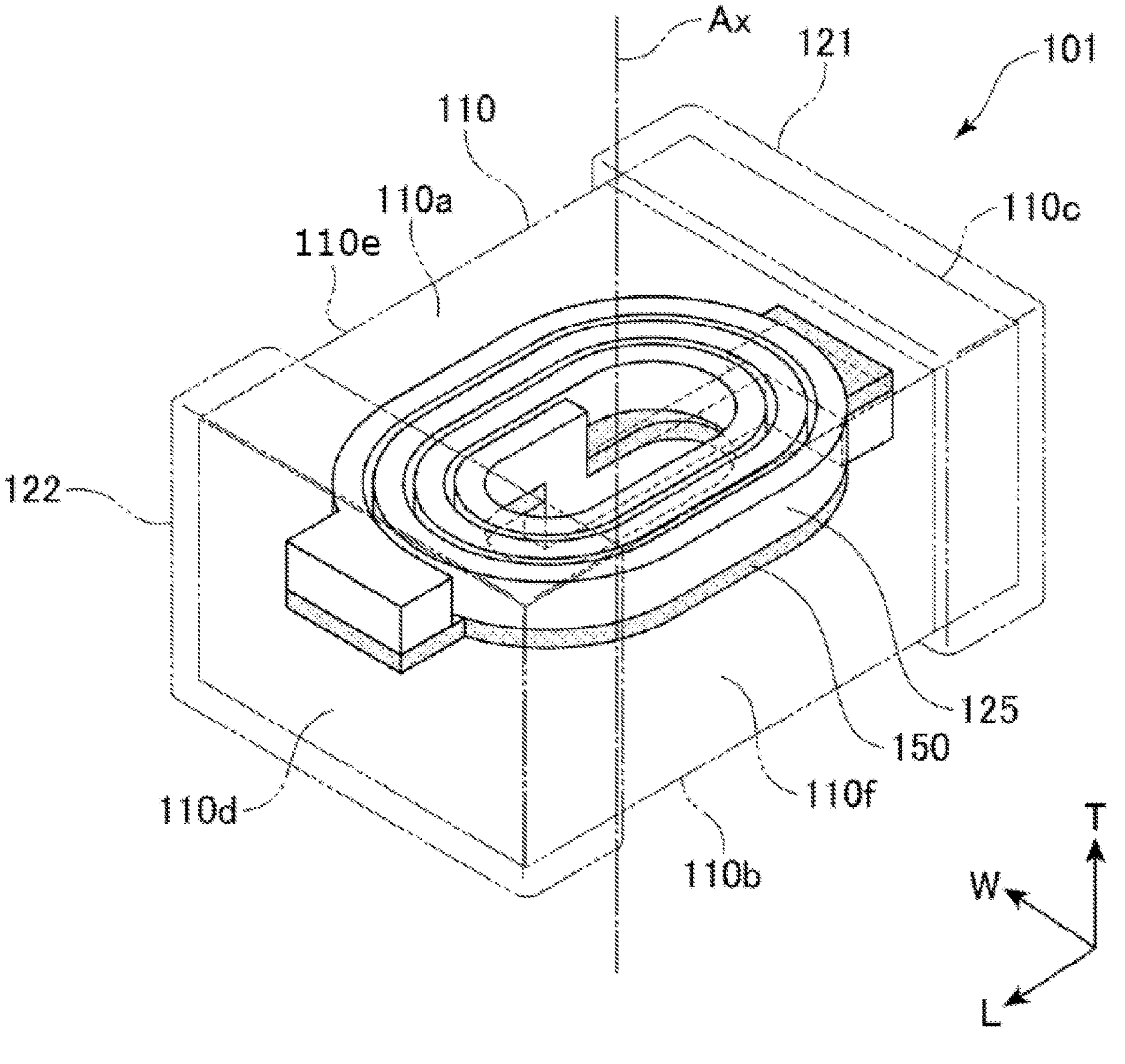
FIG. 7 is a perspective view schematically showing a coil component according to another embodiment of the present invention.

The following describes a coil component 101 relating to another embodiment of the present invention with reference to FIG. 7. The coil component 101 is a planar coil. As shown, the coil component 101 includes a magnetic base body 110, an insulating plate 150 provided in the magnetic base body 110, a coil conductor 125 provided on top and bottom surfaces of the insulating plate 150 in the magnetic base body 110, an external electrode 121 provided on the magnetic base body 110, and an external electrode 122 provided on the magnetic base body 110 at a position spaced apart from the external electrode 121. The magnetic base body 110 is made of a magnetic material, similarly to the magnetic base body 10. The insulating plate 150 is made of an insulating material and has a plate-like shape.

The magnetic base body 110 is made of a magnetic material containing a plurality of metal magnetic particles, similarly to the magnetic base body 10. In one embodiment, the magnetic base body 110 contains a plurality of first metal magnetic particles 31 and a plurality of second metal magnetic particles 41. The magnetic base body 110 is formed in a rectangular parallelepiped shape as a whole. The magnetic base body 110 has a first principal surface 110*a*, a second principal surface 110*b*, a first end surface 110*c*, a second end surface 110*d*, a first side surface 110*e*, and a second side surface 110*f*. The outer surface of the magnetic base body 110 is defined by these six surfaces. The first principal surface 110*a* and the second principal surface 110*b* are at the opposite ends in the height direction, the first end surface 110*c* and the second end surface 110*d* are at the opposite ends in the length direction, and the first side surface 110*e* and the second side surface 110*f* are at the opposite ends in the width direction. The above explanation of the magnetic base body 10 also applies to the magnetic base body 110 to a maximum extent.

The coil conductor 125 is wound spirally around a coil axis Ax extending in the thickness direction (the T-axis direction). The coil conductor 125 is connected at one end thereof to the external electrode 121 and connected at the other end thereof to the external electrode 122.

Next, a description is given of an example manufacturing method of the coil component 101. To start with, an insulating plate 150 made of a magnetic material and shaped like a plate is prepared. Next, a photoresist is applied to the top surface and the bottom surface of the insulating plate 150, and then conductor patterns are transferred onto the top surface and the bottom surface of the insulating plate 150 by exposure, and development is performed. As a result, a resist having an opening pattern for forming the coil conductor 125 is formed on each of the top surface and the bottom surface of the insulating plate 150.

Next, plating is performed, so that each of the opening patterns is filled with a conductive metal. Next, etching is performed to remove the resists from the insulating plate 150, so that the coil conductor 125 is formed on the top surface and the bottom surface of the insulating plate 150. A through-hole formed in the insulating plate 150 is filled with a conductive metal to form a via connecting the portions of the coil conductor 125, which are respectively on the front and back sides of the insulating plate 150.

The magnetic base body 110 is subsequently formed on both surfaces of the insulating plate 150 where the coil conductor 125 has been formed. To form the magnetic base body 110, a compression molding step is performed. In the compression molding step, a particle mixture of a first group of metal magnetic particles and a second group of metal magnetic particles is mixed and kneaded with a resin and a diluting solvent, thereby making a resin composition mixture. The first and second groups of metal magnetic particles respectively include the first metal magnetic particles 31 and the second metal magnetic particles 41. The resin composition mixture contains the metal magnetic particles dispersed therein. Subsequently, the resin composition mixture is applied in the form of a sheet onto a base material such as a PET film, and the applied resin composition mixture is dried to volatilize the diluting solvent. In this way, a compression-molded body shaped like a sheet is fabricated, which contains the resin and the first and second metal magnetic particles 31 and 41 dispersed in the resin. The resin molded body shaped like a sheet is referred to as a magnetic sheet. Two such magnetic sheets are provided, between which the above-described coil conductor 125 is placed, and pressure of 5 to 10 t/cm$^2$ is then applied to them while they are heated. In this way, a compression-molded body enclosing the coil conductor therein (a laminated body) is made. In the resin composition mixture before the molding pressure is applied, the first and second metal magnetic particles 31 and 41 are dispersed in the magnetic sheets. Once the molding pressure is applied to the magnetic sheets, the second metal magnetic particles 41 (the second metal magnetic particles 41A, 41B in the example of FIG. 4A) are inwardly pushed into the first metal magnetic particles (the first metal magnetic particle 31A in the example of FIG. 4A) as has been described with reference to FIG. 4A. The second metal magnetic particles 41A and 41B, which have relatively high deformation strength, do not substantially deform when inwardly pushed into the first metal magnetic particle 31A. Therefore, the depressions 31*a*1 and 31*a*2 are formed in the first metal magnetic particle 31A and shaped to conform to a part of the surface of the second metal magnetic particles 41A and 41B. As described above, as a result of the compression molding step, the second metal magnetic particles 41A and 41B move into the first metal magnetic particle 31A, so that the one or more depressions 31*a* are formed in the first metal magnetic particle 31A. The second metal magnetic particles 41A and 41B may move into any one of the other first metal magnetic particles 31 (for example, the first metal magnetic particle 31 at the upper left section in FIG. 4) in addition to or in place of the first metal magnetic particle 31A. As a result of the molding pressure applied, the second metal magnetic particles 41 other than the second metal magnetic particles 41A and 41B may also move into their adjacent first metal magnetic particles 31.

The method of manufacturing the coil component 101 next proceeds to a heat treatment step. In the heat treatment step, heat treatment is performed on the above-mentioned laminated body to produce the magnetic base body 110 enclosing therein the coil conductor 125. This heat treatment cures the resin in the resin composition mixture, so that the resin serves as the binder, and the binder binds together the first metal magnetic particles 31 and the second metal magnetic particles 41. The heat treatment is performed at a temperature equal to or higher than the curing temperature of the resin in the resin composition mixture, for example, at a temperature from 150° C. to 300° C. for a duration of 30 to 240 minutes.

The laminated body, which is obtained during the above-described manufacturing process, can be fabricated in a different manner, described in the following. According to the different method of fabricating the laminated body, the insulating plate 150 having the coil conductor 125 formed thereon is placed in a mold, into which a resin composition mixture obtained by mixing and kneading a particle mixture with a resin and a diluting solvent is poured. The particle mixture includes a first group of metal magnetic particles including the first metal magnetic particles 31 and a second group of metal magnetic particles including the second metal magnetic particles 41. Subsequently, molding pressure of 5 to 10 t/cm$^2$ is applied to the resin composition mixture in the mold while heating is performed. In this way, a molded body enclosing therein the coil conductor 125 is made. In the resin composition mixture before the molding pressure is applied, the first and second metal magnetic particles 31 and 41 are dispersed in the resin. Once the molding pressure is applied to the resin composition mixture, the second metal magnetic particles 41 (the second metal magnetic particles 41A, 41B in the example of FIG. 4A) are inwardly pushed into the first metal magnetic particles (the first metal magnetic particle 31A in the example of FIG. 4A) as has been described with reference to FIG. 4A. The second metal magnetic particles 41A and 41B, which have relatively high deformation strength, do not substantially deform when inwardly pushed into the first metal magnetic particle 31A. Therefore, the depressions 31*a*1 and 31*a*2 are formed in the first metal magnetic particle 31A and shaped to conform to a part of the surface of the second metal magnetic particles 41A and 41B. As described above, as a result of the compression molding step, the second metal magnetic particles 41A and 41B move into the first metal magnetic particle 31A, so that the one or more depressions 31*a* are formed in the first metal magnetic particle 31A. The second metal magnetic particles 41A and 41B may move into any of the other first metal magnetic particles 31 (for example, the first metal magnetic particle 31 at the upper left section in FIG. 4) in addition to or in place of the first metal magnetic particle 31A. As a result of the molding pressure applied, the second metal magnetic particles 41 other than the second metal magnetic particles 41A and 41B may also move into their adjacent first metal magnetic particles 31. The thus manufactured molded body is subjected to the above-described heat treatment, thereby making the magnetic base body 110 enclosing the coil conductor 125 therein.

Next, a conductor paste is applied to both end portions of the magnetic base body 110, which is produced in the above-described manner, to form the external electrode 121 and the external electrode 122. The external electrode 121 is electrically connected to one end of the coil conductor 125 placed within the magnetic base body 110, and the external electrode 122 is electrically connected to the other end of the coil conductor 125 placed within the magnetic base body 110. The coil component 101 is manufactured in this manner.

Figure 8:
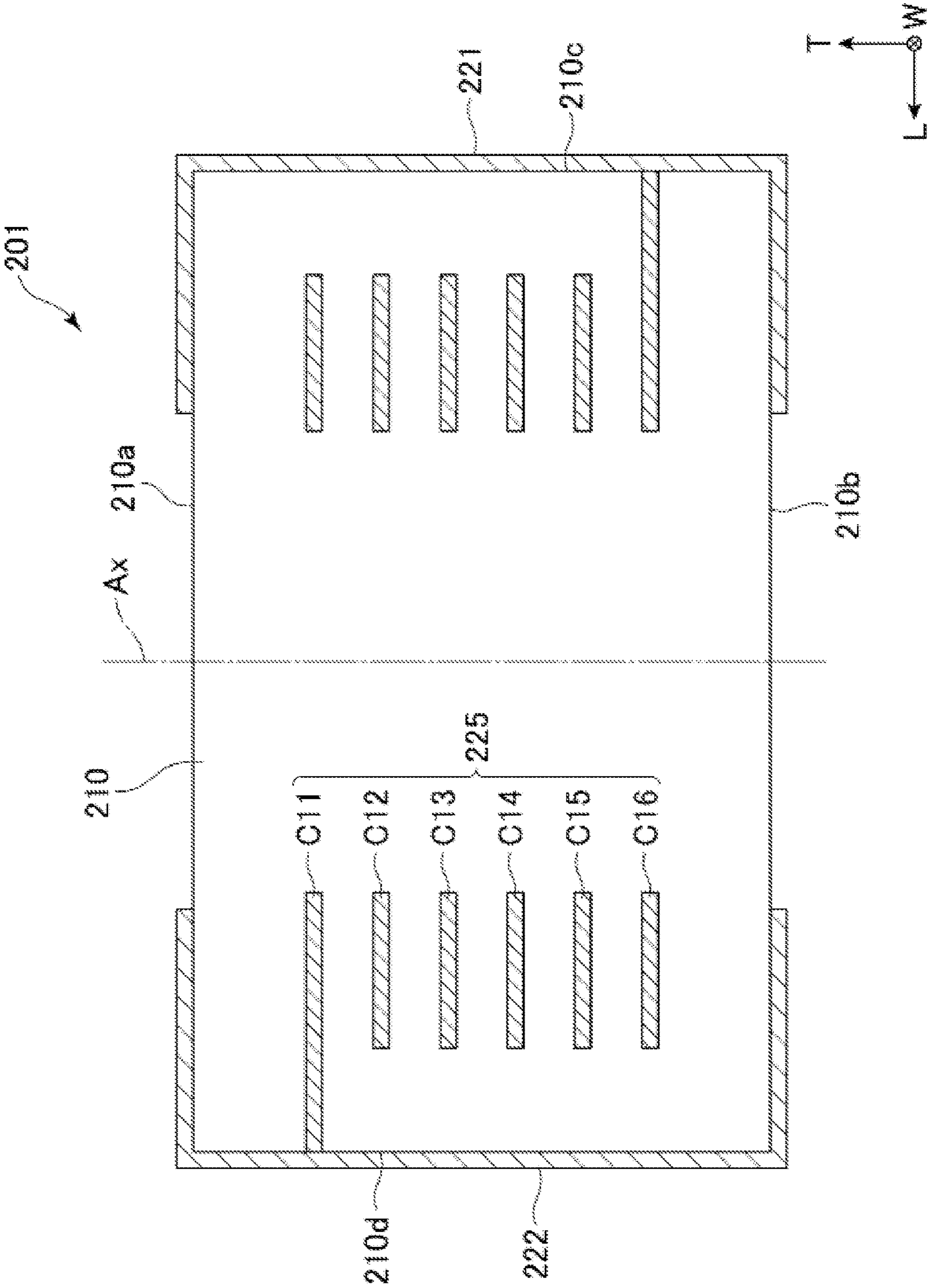
FIG. 8 is a cross-sectional view schematically showing a coil component according to another embodiment of the present invention.

The following describes a coil component 201 relating to another embodiment of the present invention with reference to FIG. 8. The coil component 201 is a laminated coil. As shown, the coil component 201 includes a magnetic base body 210, a coil conductor 225 disposed in the magnetic base body 210, an external electrode 221 disposed on the magnetic base body 210, and an external electrode 222 disposed on the magnetic base body 210 at a position spaced apart from the external electrode 221. The magnetic base body 210 is made of a magnetic material, similarly to the magnetic base body 10.

The magnetic base body 210 is made of a magnetic material containing a plurality of metal magnetic particles, similarly to the magnetic base body 10. In one embodiment, the magnetic base body 110 contains a plurality of first metal magnetic particles 31 and a plurality of second metal magnetic particles 41. The magnetic base body 210 is generally shaped as a rectangular parallelepiped and has a first principal surface 210*a*, a second principal surface 210*b*, a first end surface 210*c*, a second end surface 210*d*, a first side surface 210*e*, and a second side surface 210*f*. The outer surface of the magnetic base body 210 is defined by these six surfaces. The first principal surface 210*a* and the second principal surface 210*b* are at the opposite ends in the height direction, the first end surface 210*c* and the second end surface 210*d* are at the opposite ends in the length direction, and the first side surface 210*e* and the second side surface 210*f* are at the opposite ends in the width direction. The above explanation of the magnetic base body 10 also applies to the magnetic base body 210 to a maximum extent.

The coil conductor 225 is wound spirally around a coil axis Ax extending in the thickness direction (the T-axis direction). The coil conductor 225 includes conductor patterns C11 to C16 and via conductors (not shown) connecting adjacent ones of the conductor patterns C11 to C16. The via conductors extend along the coil axis Ax, as a whole. The conductor patterns C11 to C16 are formed by, for example, printing, onto a compression-molded body shaped like a sheet, a conductive paste made of a highly conductive metal or alloy via screen printing. The conductive paste may be made of Ag, Pd, Cu, Al, or alloys thereof. Each of the conductor patterns C11 to C16 is electrically connected to the respective adjacent conductor patterns through the via conductors. Connected in this manner, the conductor patterns C11 to C16 form the spiral coil conductor 225.

Next, a description is given of an example manufacturing method of the coil component 201. The coil component 201 can be manufactured by, for example, a lamination process. An example is hereinafter described of the manufacturing method of the coil component 201 using the lamination process.

The first step is to prepare a plurality of magnetic sheets made of a magnetic material. Each magnetic sheet can be obtained by applying a resin composition mixture, which is made by mixing and kneading a particle mixture with a thermally decomposable resin serving as a binder (for example, polyvinyl butyral (PVB) resin) and a diluting solvent, in the form of a sheet onto a base material such as a PET film and drying the applied resin composition mixture to volatilize the diluting solvent. The particle mixture includes a first group of metal magnetic particles including the first metal magnetic particles 31 and a second group of metal magnetic particles including the second metal magnetic particles 41. In this way, a magnetic sheet is fabricated, which contains the resin and the first and second metal magnetic particles 31 and 41 dispersed in the resin. The thus fabricated magnetic sheet is placed in a mold, and pressure of 5 to 10 $t/cm^2$ is applied while heating is performed. In this way, a compression-molded body shaped like a sheet is fabricated. In the magnetic sheet before the molding pressure is applied, the first and second metal magnetic particles 31 and 41 are dispersed in the resin. Once the molding pressure is applied to the resin composition mixture, the second metal magnetic particles 41 (the second metal magnetic particles 41A, 41B in the example of FIG. 4A) are inwardly pushed into the first metal magnetic particles (the first metal magnetic particle 31A in the example of FIG. 4A) as has been described with reference to FIG. 4A. The second metal magnetic particles 41A and 41B, which have relatively high deformation strength, do not substantially deform when inwardly pushed into the first metal magnetic particle 31A. Therefore, the depressions 31*a*1 and 31*a*2 are formed in the first metal magnetic particle 31A and shaped to conform to a part of the surface of the second metal magnetic particles 41A and 41B. As described above, as a result of the compression molding step, the second metal magnetic particles 41A and 41B move into the first metal magnetic particle 31A, so that the one or more depressions 31*a* are formed in the first metal magnetic particle 31A. The second metal magnetic particles 41A and 41B may move into any one of the other first metal magnetic particles 31

(for example, the first metal magnetic particle 31 in the upper left section in FIG. 4) in addition to or in place of the first metal magnetic particle 31A. As a result of the molding pressure applied, the second metal magnetic particles 41 other than the second metal magnetic particles 41A and 41B may also move into their adjacent first metal magnetic particles 31.

After this, the sheet-shaped compression-molded body is provided with a coil conductor in the following manner. To start with, a through hole is formed in the sheet-shaped compression-molded body at a predetermined position so as to penetrate through the sheet-shaped compression-molded body in the T-axis direction. Following this, a conductive paste is printed using screen printing onto the top surface of each sheet-shaped compression-molded body, so that an unsintered conductor pattern is formed on each compression-molded body and the through hole formed in each compression-molded body is filled with the conductive paste.

Next, the compression-molded bodies are stacked to obtain a coil laminated body. The compression-molded bodies are stacked such that the unsintered conductor patterns corresponding to the conductor patterns C11 to C16 formed on the respective magnetic sheets are each electrically connected to the adjacent conductor patterns through the unsintered vias.

Following this, a plurality of sheet-shaped compression-molded bodies are stacked to form a top laminated body, which is to be used as the top cover layer. Similarly, a plurality of sheet-shaped compression-molded bodies are stacked to form a bottom laminated body, which is to be used as the bottom cover layer. Next, the bottom laminated body, the coil laminated body, and the top laminated body are stacked in the stated order in the direction of the T axis from the negative side to the positive side, and these stacked laminated bodies are bonded together by thermal compression using a pressing machine to make a main laminated body. Instead of forming the bottom, coil and top laminated bodies, the main laminated body may be made by sequentially stacking all of the sheet-shaped compression-molded bodies prepared in advance and bonding the stacked compression-molded bodies collectively by thermal compression.

Next, the main laminated body is segmented to a desired size by using a cutter such as a dicing machine or a laser processing machine to make a chip laminate. Next, the chip laminate is degreased and then heated. This heating oxidizes the surface of the first and second metal magnetic particles 31 and 41, as a result of which the first and second metal magnetic particles 31 and 41 are covered with an oxide coating. The oxide coating bonds together adjacent ones of the metal magnetic particles. The heating is performed at a temperature of 350° C. to 900° C. for a duration of 30 to 360 minutes, for example. When either the first or second metal magnetic particles 31 or 41 are amorphous alloy particles, the heating can be performed at 400° C. or less. The heating may include degreasing. Alternatively, the degreasing may be independently performed from the heating. The degreasing is performed at a temperature of 200° C. to 400° C. for a duration of 20 to 120 minutes, for example. The end portions of the chip laminate are polished by barrel-polishing or the like, if necessary.

Next, a conductive paste is applied to both end portions of the chip laminate to form the external electrodes 221 and 222. The coil component 201 is obtained in the above-described manner.

Figure 9:
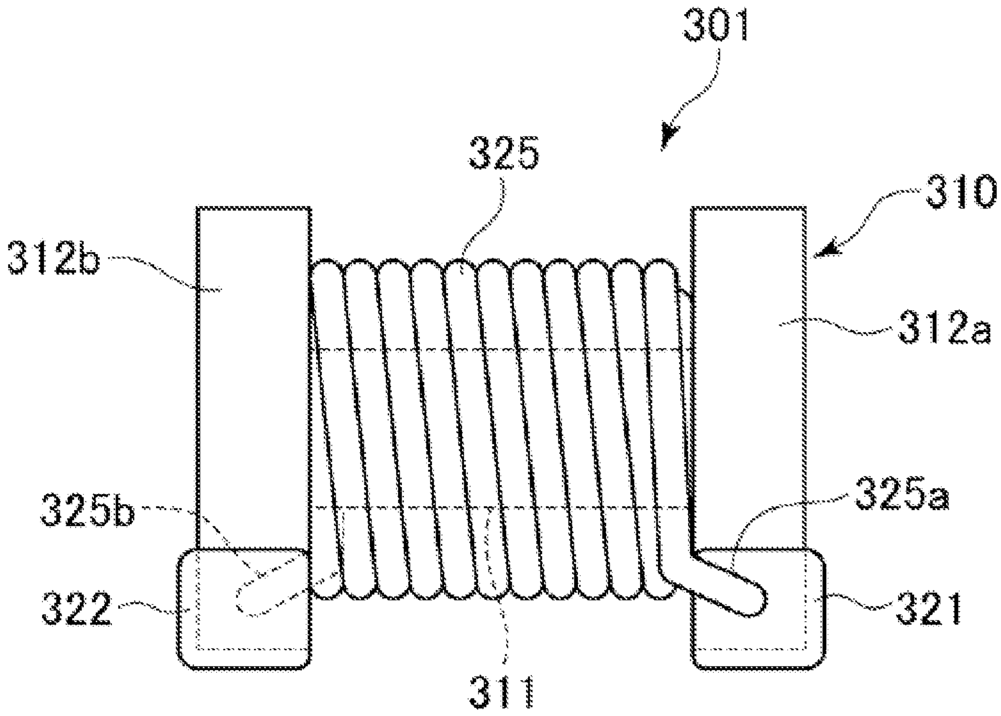
FIG. 9 is a front view schematically showing a coil component according to another embodiment of the present invention.

The following describes a coil component 301 relating to another embodiment of the present invention with reference to FIG. 9. The coil component 301 relating to one embodiment of the present invention is a winding inductor. As shown, the coil component 301 includes a magnetic base body 310, a coil conductor 325 (a winding 325), a first external electrode 321 and a second external electrode 332. The magnetic base body 310 includes a winding core 311, a flange 312*a* having a rectangular parallelepiped shape and provided on one of the ends of the winding core 311, and a flange 312*b* having a rectangular parallelepiped shape and provided on the other end of the winding core 311. The coil conductor 325 is wound on the winding core 311. The coil conductor 325 includes a conductive line made of a highly conductive metal material and an insulating coating covering and surrounding the conductive line. The first external electrode 321 extends along the bottom surface of the flange 312*a*, and the second external electrode 322 extends along the bottom surface of the flange 312*b*.

The magnetic base body 310 is made of a magnetic material containing a plurality of metal magnetic particles, similarly to the magnetic base body 10. In one embodiment, the magnetic base body 110 contains a plurality of first metal magnetic particles 31 and a plurality of second metal magnetic particles 41.

Next, a description is given of an example method of manufacturing the coil component 301. The magnetic base body 310 is first fabricated. The method of fabricating the magnetic base body 310 includes a compression molding step of subjecting a resin composition mixture to compression molding. In the compression molding step, a particle mixture of a first group of metal magnetic particles and a second group of metal magnetic particles is mixed and kneaded with a resin and a diluting solvent, thereby making a resin composition mixture. The first and second groups of metal magnetic particles respectively include the first metal magnetic particles 31 and the second metal magnetic particles 41. The resin composition mixture contains the metal magnetic particles dispersed therein. The resin composition mixture is poured into a mold, and molding pressure of 5 to 10 t/cm$^2$ is applied to the resin composition mixture in the mold while the resin composition mixture in the mold is heated. In this way, a molded body is fabricated. In the resin composition mixture before the molding pressure is applied, the first and second metal magnetic particles 31 and 41 are dispersed in the magnetic sheet. Once the molding pressure is applied to the magnetic sheets, the second metal magnetic particles 41 (the second metal magnetic particles 41A, 41B in the example of FIG. 4A) are inwardly pushed into the first metal magnetic particles (the first metal magnetic particle 31A in the example of FIG. 4A) as has been described with reference to FIG. 4A. The second metal magnetic particles 41A and 41B, which have relatively high deformation strength, do not substantially deform when inwardly pushed into the first metal magnetic particle 31A. Therefore, the depressions 31*a*1 and 31*a*2 are formed in the first metal magnetic particle 31A and shaped to conform to a part of the surface of the second metal magnetic particles 41A and 41B. As described above, as a result of the compression molding step, the second metal magnetic particles 41A and 41B move into the first metal magnetic particle 31A, so that the one or more depressions 31*a* are formed in the first metal magnetic particle 31A. The second metal magnetic particles 41A and 41B may move into any of the other first metal magnetic particles 31 (for example, the first metal magnetic particle 31 at the upper left section in FIG. 4) in addition to or in place of the first metal magnetic particle 31A. As a result of the molding pressure applied, the second metal magnetic particles 41 other than the second metal magnetic particles 41A and 41B may also move into their adjacent first metal magnetic particles 31.

The molded body resulting from the above-described compression molding step is subjected to a heat treatment step in which heat treatment is performed. The heat treatment step produces the magnetic base body 310. This heat treatment cures the resin in the resin composition mixture, so that the resin serves as the binder, and the binder binds together the first metal magnetic particles 31 and the second metal magnetic particles 41. The heat treatment is performed at a temperature equal to or higher than the curing temperature of the resin in the resin composition mixture, for example, at a temperature from 150° C. to 300° C. for a duration of 30 to 240 minutes.

After this, the magnetic base body 310 resulting from the above-described heat treatment step is provided with the coil conductor 325 in a coil providing step. In the coil providing step, the coil conductor 325 is wound around the magnetic base body 310, one end of the coil conductor 325 is connected to the first external electrode 321, and the other end is connected to the second external electrode 322. The coil component 301 is obtained in the above-described manner.

EXAMPLES

First, Fe—Si—Cr crystalline alloy particles having an average particle size of 8 μm were prepared as the first metal magnetic particles 31, and Fe—Si—Cr—B amorphous alloy particles having an average particle size of 2 μm were prepared as the second metal magnetic particles 41. These two kinds of metal magnetic powders were mixed in the ratios shown in Table 1 to obtain nine different particle mixtures. In the particle mixtures, the composition of the first metal magnetic particles 31 was Fe: 95 wt %, Si: 3.5%, Cr: 1.5 wt %, and the composition of the second metal magnetic particles 41 was Fe: 87.5 wt %, Si: 6.7%, Cr: 2.5 wt % and B:2.6%.

In addition, Fe—Si—Cr alloy particles having an average particle size of 8 μm were prepared as the first metal magnetic particles 31 similarly to the above, and Fe—Si—Cr alloy particles having an average particle size of 2 μm were prepared as the second metal magnetic particles 41 differently from the above. These two kinds of metal magnetic powders were mixed in the ratios shown in Table 2 to obtain nine different particle mixtures. In the particle mixtures, the composition of the first metal magnetic particles 31 was Fe: 95 wt %, Si: 3.5%, Cr: 1.5 wt % similarly to the above, and the composition of the second metal magnetic particles 41 was Fe: 92 wt %, Si: 6.5%, Cr: 1.5 wt % differently from the composition of the first metal magnetic particles 31.

Tables 1 and 2 use the percentage by volume to indicate the content ratios of the first and second metal magnetic particles 31 and 41 in the total volume of the first and second metal magnetic particles 31 and 41, where the latter accounts for 100 vol %.

The deformation strength of the first and second metal magnetic particles 31 and 41 was measured in the following manner using a micro compression tester (MCT-211) available from SHIMADZU Corporation. Specifically, in an environment of a room temperature and a normal relative humidity (the temperature was 25° C. and the humidity was 50%), load applied onto a probe was varied at a rate of 0.45 mN/sec from 0 mN to 30 mN, and the amount of deformation in a to-be-measured particle was measured. The measurement was performed every 10 msec. Based on the load P(N) being applied when the amount of deformation in the to-be-measured particle reached 10% or greater of the particle size and the following Expression (1), deformation strength C10 was calculated.

$$C10\ (\text{MPa})=2.48\times P/(\pi\times d^2) \qquad \text{Expression (1)}$$

When having an average particle size of 8 μm and a composition of Fe: 95 wt %, Si:3.5 wt %, Cr:1.5 wt %, the first metal magnetic particles 31 exhibited deformation strength of 158 MPa. When having an average particle size of 2 μm and a composition of Fe: 87.5 wt %, Si:6.7 wt %, Cr:2.5 wt %, B:2.6 wt %, the amorphous second metal magnetic particles 41 exhibited deformation strength of 795 MPa. The results demonstrated that the ratio in deformation strength of the second metal magnetic particles 41 to the first metal magnetic particles 31 could be 5.0 or greater when the Si content was higher in the second metal magnetic particles 41 than in the first metal magnetic particles 31 and the second metal magnetic particles 41 were amorphous particles. When having an average particle size of 2 μm and a composition of Fe: 92 wt %, Si:6.5%, Cr:1.5 wt %, the second metal magnetic particles 41 exhibited deformation strength of 321 MPa. This result demonstrated that the second metal magnetic particles 41 achieved higher deformation strength than the first metal magnetic particles 31. The results also demonstrated that the ratio in deformation strength of the second metal magnetic particles 41 to the first metal magnetic particles 31 could be 2.0 or greater when the Si content ratio was higher in the second metal magnetic particles 41 than in the first metal magnetic particles 31.

In one embodiment, the deformation strength of the first and second metal magnetic particles 31 and 41 shows no substantial change before and after the magnetic base body 10 is molded. In one embodiment, regarding the "greater than" or "less than" relation in terms of deformation strength between the first metal magnetic particles 31 and the second metal magnetic particles 41, no change is shown before and after the magnetic base body 10 is molded. In other words, the "greater than" or "less than" relation in terms of deformation strength between the first metal magnetic particles 31 and the second metal magnetic particles 41 is never reversed. In one embodiment, the ratio in deformation strength of the first metal magnetic particles 31 to the second metal magnetic particles 41 shows no substantial change before and after the magnetic base body 10 is molded. Accordingly, when it comes to the deformation strength of the first metal magnetic particles 31 and the deformation strength of the second metal magnetic particles 41 contained in the magnetic base body 10 of the final product or coil component 1, the "greater than" or "less than" relation between them and the ratio of the former to the latter, the deformation strength (C10) measured using a micro compression tester as described above before the magnetic base body 10 is molded can be employed. The same applies to the deformation strength of the first and second metal magnetic particles 31 and 41 contained in the coil components 101, 201 and 301.

Next, each of the particle mixtures was mixed and kneaded with an epoxy resin to obtain a resin composition mixture. Following this, a winding coil, which was prepared in advance, made of copper and had an insulating film on the surface thereof, was placed in a mold, the resin composition mixture made in the above manner was poured into the mold having the winding coil placed therein, molding pressure was then applied to the resin composition mixture in the mold as shown in Tables 1 and 2. In this manner, a molded body enclosing therein the coil conductor was fabricated.

The thus fabricated molded body was then subjected to heat treatment at a temperature of 200° C. for a duration of 120 minutes, thereby curing the resin in the resin composition mixture. In this way, the magnetic base body 10 having the coil conductor therein was obtained.

Next, a conductor paste was applied to both end portions of the magnetic base body obtained in the above-described manner to form the external electrode 21 and the external electrode 22. In this manner, 36 coil components (Samples 1A to 18A and Samples 1B to 18B) were obtained that were different in composition and fabricated using different levels of molding pressure.

For the obtained Samples 1A to 18A and Samples 1B to 18B, the magnetic permeability (μ) was measured using a B-H analyzer. For Samples 1A to 18A and Samples 1B to 18B, the filling factor was also measured. Specifically, each sample was cut in the thickness direction to expose a cross-section, and the ratio of the area occupied by the metal magnetic particles to the total viewing field area of the cross-section was calculated. The calculated ratio was treated as the filling factor. The results are shown in Tables 1 and 2. The results of the above-described measurement and calculation are shown in the following Tables 1 and 2.

TABLE 1

| Sample No. | First Metal Magnetic Particles vol % | Second Metal Magnetic Particles vol % | Molding Pressure t/cm2 | Filling Factor % | Magnetic Perme-ability |
|---|---|---|---|---|---|
| 1A Comparative Examle | 100 | 0 | 8 | 79 | 35 |
| 2A Comperative Example | 97 | 3 | 8 | 79.5 | 35.5 |
| 3A Example | 95 | 5 | 8 | 80.5 | 37 |
| 4A Example | 90 | 10 | 8 | 81 | 38 |
| 5A Example | 85 | 15 | 8 | 81.5 | 39 |
| 6A Example | 80 | 20 | 8 | 81.5 | 38.5 |
| 7A Example | 75 | 25 | 8 | 80.5 | 36 |
| 8A Comparative Example | 72 | 28 | 8 | 78.5 | 33.5 |
| 9A Comparative Example | 70 | 30 | 8 | 78 | 31.5 |
| 10A Comparative Example | 100 | 0 | 10 | 80 | 37 |
| 11A Comparative Example | 97 | 3 | 10 | 80 | 37.5 |
| 12A Example | 95 | 5 | 10 | 81.5 | 39 |
| 13A Example | 90 | 10 | 10 | 82.5 | 40 |
| 14A Example | 85 | 15 | 10 | 83 | 41.5 |
| 15A Example | 80 | 20 | 10 | 83 | 41 |
| 16A Example | 75 | 25 | 10 | 81.5 | 39.5 |
| 17A Comparative Example | 72 | 28 | 10 | 79 | 37 |
| 18A Comparative Example | 70 | 25 | 10 | 78.5 | 35 |

TABLE 2

| Sample No. | First Metal Magnetic Particles vol % | Second Metal Magnetic Particles vol % | Molding Pressure t/cm2 | Filling Factor % | Magnetic Perme-ability |
|---|---|---|---|---|---|
| 1B Comparative Example | 100 | 0 | 8 | 79 | 35 |
| 2B Comparative Example | 97 | 3 | 8 | 79.5 | 35.5 |
| 3B Example | 95 | 5 | 8 | 80.5 | 37.5 |
| 4B Example | 90 | 10 | 8 | 82 | 39 |

TABLE 2-continued

| Sample No. | First Metal Magnetic Particles vol % | Second Metal Magnetic Particles vol % | Molding Pressure t/cm2 | Filling Factor % | Magnetic Perme-ability |
|---|---|---|---|---|---|
| 5B Example | 85 | 15 | 8 | 82.5 | 41 |
| 6B Example | 80 | 20 | 8 | 83 | 41 |
| 7B Example | 75 | 25 | 8 | 81 | 39 |
| 8B Comparative Example | 72 | 28 | 8 | 79 | 36.5 |
| 9B Comparative Example | 70 | 30 | 8 | 78.5 | 34.5 |
| 10B Comparative Example | 100 | 0 | 10 | 80 | 37 |
| 11B Comparative Example | 97 | 3 | 10 | 80.5 | 37.5 |
| 12B Example | 95 | 5 | 10 | 82 | 41 |
| 13B Example | 90 | 10 | 10 | 83 | 42 |
| 14B Example | 85 | 15 | 10 | 83.5 | 42.5 |
| 15B Example | 80 | 20 | 10 | 84 | 42.5 |
| 16B Example | 75 | 25 | 10 | 82.5 | 41 |
| 17B Comparative Example | 72 | 28 | 10 | 80 | 38.5 |
| 18B Comparative Example | 70 | 25 | 10 | 79 | 37 |

As shown in Tables 1 and 2, Samples 3A to 7A, 12A to 16A, 3B to 7B, and 12B to 16B achieved a filling factor of over 80%, which is difficult to accomplish merely by mixing together a plurality of types of metal magnetic particles having different average particle sizes, and also accomplished improvement in permeability.

Advantageous effects of the above embodiments will now be described. According to at least one of the embodiments of the present invention, the first metal magnetic particles 31 have the depressions 31*a* shaped to conform to a part of the surface of the second metal magnetic particles 41. The second metal magnetic particles are partially accommodated in the depressions 31*a*, and this can reduce the gaps between the first metal magnetic particles 31 and the second metal magnetic particles 41. Accordingly, the magnetic base bodies 10, 110, 210 can achieve improved filling factor for the metal magnetic particles.

According to at least one of the embodiments of the present invention, the second metal magnetic particles 41 have higher deformation strength than the first metal magnetic particles 31 and are therefore more difficult to be deformed than the first metal magnetic particles 31 when exposed to compressive stress. For this reason, the insulating film 41*b* formed on the surface of the second metal magnetic particles 41 is difficult to be damaged. Due to its low ductility, the insulating film 41*b* is easily damaged by the deformation of the second metal magnetic particles 41. If the insulating film 41*b* is destroyed, a short circuit may occur between adjacent ones of the metal magnetic particles. This turns the adjacent metal magnetic particles into a single particle having a large diameter, which disadvantageously exhibits increased eddy current loss. According to at least one of the embodiments disclosed herein, the insulating film 41*b* can be completely or partly prevented from being destroyed. This in turn prevents a short circuit from occurring between adjacent ones of the metal magnetic particles (for example, between the first metal magnetic particles 31 and the second metal magnetic particles 41).

According to at least one of the embodiments of the present invention, the second metal magnetic particles 41 have higher deformation strength than the first metal magnetic particles 31. Accordingly, when compressive stress is applied to the magnetic material containing the first and second metal magnetic particles 31 and 41, the first metal magnetic particles 31 are deformed, so that the compressive stress is more likely to be transferred not only to the first metal magnetic particles 31 but also to the second metal magnetic particles 41. When the deformation strength of the first metal magnetic particles 31 is substantially equal to the deformation strength of the second metal magnetic particles 41, or when the former is higher than the latter, the first metal magnetic particles 31 are difficult to be deformed, so that the compressive stress is less likely to be transferred to the second metal magnetic particles 41 between the first metal magnetic particles 31. If the compressive stress is not transferred to the second metal magnetic particles 41, gaps are likely to be left around the second metal magnetic particles 41 between the second metal magnetic particles 41 and other particles (including the first metal magnetic particles 31 and the other second metal magnetic particles 41). This obstructs sufficient improvement in filling factor in conventional coil components. According to at least one of the embodiments of the present invention, the compressive stress is easily transferred to the second metal magnetic particles 41 for the reasons stated above, which reduces the gaps around the second metal magnetic particles 41 between the second metal magnetic particles 41 and the other metal magnetic particles. As a result, the magnetic base bodies 10, 110, 210 can achieve improved filling factor for the metal magnetic particles.

According to at least one of the embodiments disclosed herein, the first metal magnetic particles 31 accounts for, in the percent by volume, a higher content ratio than the second metal magnetic particles 41 in the magnetic base bodies 10, 110, 210. Therefore, the magnetic base bodies 10, 110, 210 can achieve enhanced saturation magnetic flux density when the Fe content ratio is higher in the first metal magnetic particles 31 than in the second metal magnetic particles 41, when compared with a case where the Fe content ratio is lower in the first metal magnetic particles 31 than in the second metal magnetic particles 41.

According to at least one of the embodiments of the present invention, the Si content ratio is higher in the second metal magnetic particles 41 than in the first metal magnetic particles 31. Accordingly, the second metal magnetic particles 41 can achieve higher deformation strength than the first metal magnetic particles 31. When the Si content ratios in the first and second metal magnetic particles 31 and 41 are tuned in this way, the second metal magnetic particles 41 can achieve higher deformation strength than the first metal magnetic particles 31.

According to at least one of the embodiments of the present invention, the magnetic base bodies 10, 110, 210 are fabricated by compression-molding the magnetic material containing the first group of metal magnetic particles including the first metal magnetic particles 31 of the first deformation strength and the second group of metal magnetic particles including the second metal magnetic particles 41 of the second deformation strength higher than the first deformation strength. Accordingly, as a result of the application of the molding pressure in the compression molding step, the second metal magnetic particles 41 move into their adjacent first metal magnetic particles 31, so that the one or more depressions 31*a* are formed on the surface of the first metal magnetic particles 31. As described above, according to at least one of the embodiments of the present invention, the compression molding is performed on the magnetic material containing two types of metal magnetic particles having different deformation strength levels. In this way, the second metal magnetic particles 41 are guided into the first metal magnetic particles 31, and this can in turn allow the magnetic base bodies 10, 110, 210 to achieve improved filling factor for the metal magnetic particles. Since the second metal magnetic particles 41 move into the first metal magnetic particles 31, the magnetic base bodies 10, 110, 210 relating to at least one of the embodiments of the present invention can achieve improved filling factor for the metal magnetic particles without the need of additional steps other than the compression molding step, when compared with conventional magnetic base bodies containing two types of metal magnetic particles having different average particle sizes (magnetic base bodies in which small particles with a relatively smaller average particle size do not move into larger particles with a relatively larger average particle size).

The dimensions, materials, and arrangements of the constituent elements described for the above various embodiments are not limited to those explicitly described for the embodiments, and these constituent elements can be modified to have any dimensions, materials, and arrangements within the scope of the present invention. Furthermore, constituent elements not explicitly described herein can also be added to the above-described embodiments, and it is also possible to omit some of the constituent elements described for the embodiments.

What is claimed is:

1. A coil component comprising:

a base body containing a first group of metal magnetic particles having a first average particle size and a second group of metal magnetic particles having a second average particle size smaller than the first average particle size;

a coil conductor provided in the base body;

a first external electrode electrically connected to the coil conductor; and a second external electrode electrically connected to the coil conductor;

wherein the first group of metal magnetic particles includes first metal magnetic particles, wherein the second group of metal magnetic particles includes second metal magnetic particles, and each second metal magnetic particle has an insulating film formed on a surface thereof, wherein each first metal magnetic particle has three or more depressions, a first one of the three or more depressions shaped to conform to a part of the surface of a first adjacent one of the second metal magnetic particles, a second one of the three or more depressions shaped to conform to a part of a surface of a second adjacent one of the second metal magnetic particles, a third one of the three or more depressions shaped to conform to a part of a surface of a third adjacent one of the second metal magnetic particles, and wherein the first adjacent one of the second metal magnetic particles is in direct contact with at least a part of the first one of the three or more depressions of the adjacent one of the first metal magnetic particles, wherein the second adjacent one of the second metal magnetic particles is in direct contact with at least a part of the second one of the three or more depressions of the adjacent one of the first metal magnetic particles, and wherein the third adjacent one of the second metal magnetic particles is in direct contact with at least a part of the third one of the three or more depressions of the adjacent one of the first metal magnetic particles.

2. The coil component of claim 1, wherein the first metal magnetic particles have a first deformation strength, and wherein the second metal magnetic particles have a second deformation strength higher than the first deformation strength.

3. The coil component of claim 2, wherein a ratio of the second deformation strength to the first deformation strength is 5.0 or greater.

4. The coil component of claim 2, wherein a ratio of the second deformation strength to the first deformation strength is 2.0 or greater.

5. The coil component of claim 1, wherein in a cross-section of the base body, a distance between a geometric center of gravity of each first metal magnetic particle and a geometric center of gravity of an adjacent one of the second metal magnetic particles is less than a sum of the first average particle size and the second average particle size.

6. The coil component of claim 1, wherein when a total volume of the first group of metal magnetic particles and the second group of metal magnetic particles contained in the base body accounts for 100 vol %, a content of the first group of metal magnetic particles ranges from 75 vol % to 95 vol %.

7. The coil component of claim 6, wherein the first metal magnetic particles and the second metal magnetic particles both contain Fe, and wherein an Fe content is higher in the first metal magnetic particles than in the second metal magnetic particles.

8. The coil component of claim 1, wherein an Si content is higher in the second metal magnetic particles than in the first metal magnetic particles.

9. The coil component of claim 1, wherein the first metal magnetic particles are crystalline alloy particles and the second metal magnetic particles are amorphous alloy particles.

10. The coil component of claim 1, wherein the base body contains a third group of metal magnetic particles having a third average particle size smaller than the second average particle size, and wherein the third group of metal magnetic particles includes third metal magnetic particles, and wherein each first metal magnetic particle has a depression shaped to conform to a part of a surface of an adjacent one of the third metal magnetic particles.

11. The coil component of claim 1, wherein said one or more depressions of the adjacent one of the first metal magnetic particles has a same or substantially a same curvature as the surface of the adjacent one of the second metal magnetic particles.

12. The coil component of claim 1, wherein $(K2-K1)/K2$ is less than 0.05, K1 representing a first curvature of said one or more depressions of the adjacent one of the first metal magnetic particles, K2 representing a second curvature of the surface of the adjacent one of the second metal magnetic particles.

13. The coil component of claim 12, wherein a part of the surface of the adjacent one of the second metal magnetic particles that is in contact with said one or more depressions depression accounts for 10% or greater of a total surface area of the adjacent one of the second metal magnetic particles.

14. The coil component of claim 12, wherein 50% or greater of said the one or more depressions of the adjacent one of the first metal magnetic particles is in contact with the adjacent one of the second metal magnetic particles.

15. A circuit board comprising:

the coil component of claim 1; and a mounting substrate soldered to the first and second external electrodes.

16. An electronic device comprising the circuit board of claim 15.

* * * * *